US012279262B2

(12) United States Patent
Cheng

(10) Patent No.: US 12,279,262 B2
(45) Date of Patent: *Apr. 15, 2025

(54) INFORMATION TRANSMISSION METHOD, TERMINAL DEVICE, AND NETWORK DEVICE

(71) Applicant: HUAWEI TECHNOLOGIES CO., LTD., Guangdong (CN)

(72) Inventor: Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,995

(22) Filed: Sep. 22, 2023

(65) Prior Publication Data

US 2024/0032037 A1    Jan. 25, 2024

Related U.S. Application Data

(63) Continuation of application No. 17/735,250, filed on May 3, 2022, now Pat. No. 11,805,523, which is a (Continued)

(30) Foreign Application Priority Data

Sep. 30, 2016 (CN) .......................... 201610878906.2

(51) Int. Cl.
*H04W 72/20* (2023.01)
*H04L 1/1812* (2023.01)
(Continued)

(52) U.S. Cl.
CPC .......... *H04W 72/20* (2023.01); *H04L 5/0055* (2013.01); *H04W 72/04* (2013.01);
(Continued)

(58) Field of Classification Search
None
See application file for complete search history.

(56) References Cited

U.S. PATENT DOCUMENTS 10,616,886 B2 *   4/2020  Marinier ............... H04L 1/1896
2011/0243066 A1 * 10/2011  Nayeb Nazar ........ H04W 72/21
                                          370/328
(Continued)

FOREIGN PATENT DOCUMENTS

CN    101472300    7/2009
CN    104641577    5/2015
(Continued)

OTHER PUBLICATIONS

Extended European Search Report issued in European Application No. 17855033.1 on Aug. 30, 2019, 9 pages.
(Continued)

*Primary Examiner* — Mariela Vidal Carpio
(74) *Attorney, Agent, or Firm* — Fish & Richardson P.C.

(57) ABSTRACT

A method includes: receiving downlink control information to a terminal device, wherein the downlink control information comprises first information, the first information indicates an uplink control channel resource for carrying uplink control information, the uplink control channel resource belongs to a first uplink control channel resource set, wherein each resource in the first uplink control channel resource set occupies a different quantity of symbols, the first uplink control channel resource set comprises at least two uplink control channel resources, wherein the at least two uplink control channel resources include a first uplink control channel resource that occupies one symbol, and a second uplink control channel resource that occupies two
(Continued)

symbols; and sending the uplink control information from the terminal device by using the uplink control channel resource.

20 Claims, 8 Drawing Sheets

Related U.S. Application Data continuation of application No. 16/370,058, filed on Mar. 29, 2019, now Pat. No. 11,356,983, which is a continuation of application No. PCT/CN2017/104835, filed on Sep. 30, 2017.

(51) Int. Cl.
*H04L 5/00* (2006.01)
*H04W 72/04* (2023.01)
*H04W 72/0446* (2023.01)

(52) U.S. Cl.
CPC ....... *H04W 72/0446* (2013.01); *H04L 1/1812* (2013.01); *H04L 5/0053* (2013.01)

(56) References Cited

U.S. PATENT DOCUMENTS

| | | | |
|---|---|---|---|
| 2012/0039275 A1 | 2/2012 | Chen et al. | |
| 2012/0113831 A1 | 5/2012 | Pelletier et al. | |
| 2013/0155978 A1 | 6/2013 | Choi et al. | |
| 2014/0177586 A1* | 6/2014 | Jang | H04L 5/0053 370/329 |
| 2014/0362792 A1* | 12/2014 | Cheng | H04W 72/21 370/329 |
| 2015/0208402 A1 | 7/2015 | Hwang et al. | |
| 2016/0113004 A1* | 4/2016 | Yu | H04L 5/0053 370/329 |
| 2016/0219618 A1* | 7/2016 | Rico Alvarino | H04L 1/0026 |
| 2017/0111894 A1* | 4/2017 | Chen | H04W 72/21 |
| 2018/0145796 A1* | 5/2018 | Liang | H04L 1/1861 |
| 2018/0167935 A1* | 6/2018 | Yan | H04L 5/0055 |
| 2018/0242301 A1 | 8/2018 | Hwang et al. | |
| 2018/0249447 A1* | 8/2018 | Lahetkangas | H04L 5/0082 |
| 2018/0255566 A1* | 9/2018 | Takeda | H04W 72/23 |
| 2018/0359745 A1* | 12/2018 | Yeo | H04W 72/12 |
| 2019/0045536 A1* | 2/2019 | Gao | H04L 5/0048 |
| 2019/0090258 A1* | 3/2019 | Ryu | H04L 1/1861 |
| 2019/0097779 A1* | 3/2019 | Wu | H04L 1/1858 |
| 2019/0159191 A1* | 5/2019 | Kim | H04W 72/04 |
| 2019/0280820 A1* | 9/2019 | Kim | H04L 1/1614 |
| 2020/0221444 A1* | 7/2020 | Tiirola | H04W 72/21 |
| 2021/0352658 A1* | 11/2021 | Baldemair | H04L 1/1896 |

FOREIGN PATENT DOCUMENTS

| | | |
|---|---|---|
| CN | 104704757 | 6/2015 |
| CN | 104969499 | 10/2015 |
| CN | 105814827 | 7/2016 |
| CN | 113411894 | 4/2022 |
| JP | 2013535937 | 9/2013 |
| KR | 101503872 | 3/2015 |

OTHER PUBLICATIONS

Huawei et al., "Overview of frame structure for NR," 3GPP TSG RAN WG1 Meeting #86, R1-166102, XP051140062, Aug. 22-26, 2016, 8 pages.

Huawei, HiSilicon, "Discussion on control channel design," 3GPP TSG RAN WG1 Meeting #86, R1-167203, Gothenburg, Sweden, Aug. 22-26, 2016, 5 pages.

Huawei, HiSilicon, "Discussion on time domain structures," 3GPP TSG RAN WG1 Meeting #86bis, R1-1608836, Lisbon, Portugal, XP051148890, Oct. 10-14, 2016, 5 pages.

LG Electronics, "Discussion on frame structure for Nr," 3GPP TSG RAN WG1 Meeting #85, R1-164560, XP051096379, May 23-27, 2016, 8 pages.

Office Action in Chinese Appln. No. 201610878906.2, dated Feb. 25, 2023, 11 pages.

Office Action issued in Chinese Application No. 202110519948.8 on Dec. 14, 2021, 13 pages (with English translation).

Office Action issued in Japanese Application No. 2019-517238 on Apr. 7, 2020, 13 pages (with English translation).

Office Action issued in Korean Application No. 2019-7012453 on May 28, 2020, 8 pages (with English translation).

PCT International Search Report and Written Opinion issued in International Application No. PCT/CN2017/104835 on Sep. 30, 2017, 11 pages.

* cited by examiner

INFORMATION TRANSMISSION METHOD, TERMINAL DEVICE, AND NETWORK DEVICE

CROSS-REFERENCE TO RELATED APPLICATIONS

This application is a continuation of U.S. patent application Ser. No. 17/735,250, filed on May 3, 2022, which is a continuation of U.S. patent application Ser. No. 16/370,058, filed on Mar. 29, 2019, now U.S. Pat. No. 11,356,983, which is a continuation of International Application No. PCT/CN2017/104835, filed on Sep. 30, 2017, which claims priority to Chinese Patent Application No. 201610878906.2, filed on Sep. 30, 2016, All of the afore-mentioned patent applications are hereby incorporated by reference in their entireties.

TECHNICAL FIELD

This application relates to the field of communications technologies, and in particular, to an information transmission method, a terminal device, and a network device.

BACKGROUND

A 5G communications system is intended to support higher system performance and can support different services, different deployment scenarios, and different spectrums. The supported services may include an enhanced mobile broadband (eMBB) service, a machine type communication (MTC) service, an ultra-reliable and low latency communications (URLLC) service, a multimedia broadcast multicast service (MBMS), a positioning service, and the like. The supported deployment scenarios may include an indoor hotspot scenario, a dense urban scenario, a suburban scenario, an urban macro coverage scenario, a high-speed railway scenario, and the like. The supported spectrums may include any frequency range within 100 GHz.

In the 5G communications system, a user plane latency is an important counter. To meet latency requirements of different services, for different services and different user capabilities, the 5G communications system supports a flexible hybrid automatic repeat request (HARQ) feedback. In other words, different HARQ timing may be used. Quantities of HARQ-ACK feedbacks corresponding to different subframes may be different due to flexible HARQ timing. Consequently, a few resources are used in some subframes to feed back uplink control information, and many resources are used in some subframes to feed back uplink control information.

Currently, a fixed uplink control channel resource is usually reserved to transmit uplink control information. However, if an uplink control channel resource is reserved in each subframe according to maximum available resources, resource utilization is reduced; and if an uplink control channel resource is reserved in each subframe according to minimum available resources, uplink control channels may be insufficient to feed back some uplink control information, causing unnecessary data retransmission and reducing resource utilization.

It can be learned that how to flexibly configure an uplink control channel resource is an urgent technical problem to be resolved.

SUMMARY

Embodiments of this application provide an information transmission method, a terminal device, and a network device, to flexibly reserve and indicate uplink control channel resources in different subframes, so that configuration flexibility of the uplink control channel resources and system resource utilization are improved.

According to a first aspect, an embodiment of this application provides an information transmission method, where the method may include: A terminal device receives downlink control information, where the downlink control information includes first information, the first information is used to indicate an uplink control channel resource for carrying uplink control information, the uplink control channel resource belongs to a first uplink control channel resource set, and the first uplink control channel resource set includes at least two uplink control channel resources that correspond to different quantities of symbols, or includes at least two uplink control channel resources that correspond to different quantities of resource blocks; the terminal device determines, based on the first information, the uplink control channel resource for carrying uplink control information; and the terminal device sends uplink control information to a network device by using the uplink control channel resource.

According to the information transmission method provided in the first aspect, the terminal device receives the first information in the downlink control information. A quantity of symbols or resource blocks corresponding to reserved uplink control channel resource that is used to carry uplink control information and that is indicated by the first information is not fixed, but may be changed. In other words, an uplink control channel resource that is used to transmit uplink control information in each subframe may be flexibly changed. Therefore, the first information may be used to flexibly reserve and indicate the uplink control channel resource that is used to transmit uplink control information in each subframe. In this way, configuration flexibility of the uplink control channel resource is improved, and system resource utilization is improved.

Optionally, in a possible implementation of the first aspect, the method may further include: The terminal device receives higher layer signaling; and the terminal device determines the first uplink control channel resource set based on the higher layer signaling.

According to the information transmission method provided in this possible implementation, the terminal device receives the higher layer signaling, and the terminal device may learn of, by using the higher layer signaling, all uplink control channel resources included in the first uplink control channel resource set that are configured by the network device. Because the terminal device may learn of a quantity of symbols or resource blocks that is flexibly configured by the network device based on different scenario requirements and different service requirements, configuration flexibility of the uplink control channel resource is further improved, and uplink control information transmission performance is ensured.

Optionally, in a possible implementation of the first aspect, that the terminal device determines the first uplink control channel resource set based on the higher layer signaling includes: The terminal device determines, based on the higher layer signaling, quantities of symbols corresponding to uplink control channel resources in the first uplink control channel resource set; or the terminal device determines, based on the higher layer signaling, quantities of resource blocks corresponding to uplink control channel resources in the first uplink control channel resource set.

Optionally, in a possible implementation of the first aspect, that the first uplink control channel resource set includes at least two uplink control channel resources that correspond to different quantities of symbols may include: The first uplink control channel resource set includes a first uplink control channel resource, and the first uplink control channel resource corresponds to one symbol; and the first uplink control channel resource set further includes a second uplink control channel resource, and the second uplink control channel resource corresponds to two symbols.

Optionally, in a possible implementation of the first aspect, that the first uplink control channel resource set includes at least two uplink control channel resources that correspond to different quantities of symbols may include: The first uplink control channel resource set includes a third uplink control channel resource, and the third uplink control channel resource corresponds to seven symbols; and the first uplink control channel resource set further includes a fourth uplink control channel resource, and the fourth uplink control channel resource corresponds to 14 symbols.

Optionally, in a possible implementation of the first aspect, that the first uplink control channel resource set includes at least two uplink control channel resources that correspond to different quantities of symbols may include: The first uplink control channel resource set includes a first uplink control channel resource, and the first uplink control channel resource corresponds to one symbol; and the first uplink control channel resource set further includes a second uplink control channel resource, and the second uplink control channel resource corresponds to two symbols; the first uplink control channel resource set further includes a fifth uplink control channel resource, and a third uplink control channel resource corresponds to three symbols; and the first uplink control channel resource set further includes a sixth uplink control channel resource, and a fourth uplink control channel resource corresponds to four symbols.

Optionally, in a possible implementation of the first aspect, that the first uplink control channel resource set includes at least two uplink control channel resources that correspond to different quantities of resource blocks may include: The first uplink control channel resource set includes a seventh uplink control channel resource, and the seventh uplink control channel resource corresponds to one resource block; and the first uplink control channel resource set further includes an eighth uplink control channel resource, and the eighth uplink control channel resource corresponds to two resource blocks.

Optionally, in a possible implementation of the first aspect, that the first uplink control channel resource set includes at least two uplink control channel resources that correspond to different quantities of resource blocks may include: The first uplink control channel resource set includes a ninth uplink control channel resource, and the ninth uplink control channel resource corresponds to three resource blocks; and the first uplink control channel resource set further includes a tenth uplink control channel resource, and the tenth uplink control channel resource corresponds to four resource blocks.

According to the information transmission method provided in the foregoing five possible implementations, the quantity of symbols or resource blocks corresponding to the uplink control channel resource that is used to carry uplink control information and that is indicated by the first information may be any one of the foregoing implementations. Therefore, the first information may be used to flexibly reserve and indicate the quantity of resource blocks of the uplink control channel resource. In this way, configuration flexibility of the uplink control channel resource is improved.

Optionally, in a possible implementation of the first aspect, that a terminal device receives downlink control information, where the downlink control information includes first information, and the first information is used to indicate an uplink control channel resource for carrying uplink control information may include: The terminal device receives a downlink control channel, where downlink control information carried on the downlink control channel includes first information, and the first information is used to indicate an uplink control channel resource for carrying uplink control information; or the terminal device receives a downlink control channel, where a downlink control information format corresponding to the downlink control channel includes a first information field, and the first information field is used to indicate an uplink control channel resource for carrying uplink control information; or the terminal device detects a downlink control information format, where the downlink control information format includes a first information field, and the first information field is used to indicate an uplink control channel resource for carrying uplink control information.

The information transmission method provided in this possible implementation provides a specific implementation of receiving the downlink control channel by the terminal device. This improves information transmission flexibility.

Optionally, in a possible implementation of the first aspect, the uplink control channel resource may be a time-frequency domain resource and/or a code resource corresponding to an uplink control channel.

Optionally, in a possible implementation of the first aspect, the code resource may be a cyclic shift and/or an orthogonal spreading code of a sequence corresponding to the uplink control channel.

Optionally, in a possible implementation of the first aspect, that the terminal device determines the first uplink control channel resource set based on the higher layer signaling may include: The terminal device determines, based on the higher layer signaling, quantities of symbols corresponding to uplink control channel resources in the first uplink control channel resource set, or quantities of resource blocks corresponding to uplink control channel resources in the first uplink control channel resource set; or the terminal device determines, based on the higher layer signaling, resource indexes corresponding to uplink control channel resources in the first uplink control channel resource set; or the terminal device determines, based on the higher layer signaling, resource indexes corresponding to uplink control channel resources in the first uplink control channel resource set, and the terminal device determines, based on the resource indexes, quantities of symbols or resource blocks corresponding to the resource indexes.

Optionally, in a possible implementation of the first aspect, if the first information corresponds to a 2-bit information field, that the first information is used to indicate the uplink control channel resource for carrying uplink control information may be as follows: If the 2-bit information field corresponding to the first information is 00, the uplink control channel resource for carrying uplink control information is the $1^{st}$ uplink control channel resource; if the 2-bit information field corresponding to the first information is 01, the uplink control channel resource for carrying uplink control information is the $2^{nd}$ uplink control channel resource; if the 2-bit information field corresponding to the first information is 10, the uplink control channel resource for carrying uplink control information is the $3^{rd}$ uplink control channel resource; or if the 2-bit information field corresponding to the first information is 11, the uplink control channel resource for carrying uplink control information is the $4^{th}$ uplink control channel resource.

According to the information transmission method provided in this possible implementation, the quantity of symbols or resource blocks corresponding to the uplink control channel resource that is used to carry uplink control information and that is indicated by the first information varies. Therefore, the first information may be used to flexibly reserve and indicate the quantity of resource blocks of the uplink control channel resource. In this way, configuration flexibility of the uplink control channel resource is improved.

According to a second aspect, an embodiment of this application provides an information transmission method, where the method may include: A network device sends downlink control information, where the downlink control information includes first information, the first information is used to indicate an uplink control channel resource for carrying uplink control information, the uplink control channel resource belongs to a first uplink control channel resource set, and the first uplink control channel resource set includes at least two uplink control channel resources that correspond to different quantities of symbols, or includes at least two uplink control channel resources that correspond to different quantities of resource blocks; and the network device receives, on the uplink control channel resource for carrying uplink control information, uplink control information sent by a terminal device.

According to the information transmission method provided in the second aspect, the network device sends the downlink control information, where the downlink control information includes the first information, and a quantity of symbols or resource blocks corresponding to the reserved uplink control channel resource that is used to carry uplink control information and that is indicated by the first information is not fixed, but may be changed. Therefore, the first information may be used to flexibly reserve and indicate an uplink control channel resource that is used to transmit uplink control information in each subframe. In this way, configuration flexibility of the uplink control channel resource is improved, and system resource utilization is improved.

Optionally, in a possible implementation of the second aspect, the method may further include: The network device sends higher layer signaling, where the higher layer signaling is used to indicate the first uplink control channel resource set.

According to the information transmission method provided in this possible implementation, the network device may flexibly configure a quantity of required symbols or resource blocks to meet different scenario requirements and different service transmission requirements, and the network device may configure all uplink control channel resources included in the first uplink control channel resource set for the terminal device by using the higher layer signaling. In this way, configuration flexibility of the uplink control channel resource is further improved, and uplink control information transmission performance is ensured.

Optionally, in a possible implementation of the second aspect, that the higher layer signaling is used to indicate the first uplink control channel resource set includes: The higher layer signaling is used to indicate quantities of symbols corresponding to uplink control channel resources in the first uplink control channel resource set; or the higher layer signaling is used to indicate quantities of resource blocks corresponding to uplink control channel resources in the first uplink control channel resource set.

Optionally, in a possible implementation of the second aspect, that the first uplink control channel resource set includes at least two uplink control channel resources that correspond to different quantities of symbols may include: The first uplink control channel resource set includes a first uplink control channel resource, and the first uplink control channel resource corresponds to one symbol; and the first uplink control channel resource set further includes a second uplink control channel resource, and the second uplink control channel resource corresponds to two symbols.

Optionally, in a possible implementation of the second aspect, that the first uplink control channel resource set includes at least two uplink control channel resources that correspond to different quantities of symbols may include: The first uplink control channel resource set includes a third uplink control channel resource, and the third uplink control channel resource corresponds to seven symbols; and the first uplink control channel resource set further includes a fourth uplink control channel resource, and the fourth uplink control channel resource corresponds to 14 symbols.

Optionally, in a possible implementation of the second aspect, that the first uplink control channel resource set includes at least two uplink control channel resources that correspond to different quantities of resource blocks may include: The first uplink control channel resource set includes a seventh uplink control channel resource, and the seventh uplink control channel resource corresponds to one resource block; and the first uplink control channel resource set further includes an eighth uplink control channel resource, and the eighth uplink control channel resource corresponds to two resource blocks.

Optionally, in a possible implementation of the second aspect, that the first uplink control channel resource set includes at least two uplink control channel resources that correspond to different quantities of resource blocks may include: The first uplink control channel resource set includes a ninth uplink control channel resource, and the ninth uplink control channel resource corresponds to three resource blocks; and the first uplink control channel resource set further includes a tenth uplink control channel resource, and the tenth uplink control channel resource corresponds to four resource blocks.

According to the information transmission method provided in the foregoing four possible implementations, the quantity of symbols or resource blocks corresponding to the uplink control channel resource that is used to carry uplink control information and that is indicated by the first information varies. Therefore, the first information may be used to flexibly reserve and indicate the quantity of resource blocks of the uplink control channel resource. In this way, configuration flexibility of the uplink control channel resource is improved.

According to a third aspect, an embodiment of this application provides an information transmission method, where the method includes: A terminal device receives downlink control information, where the downlink control information includes first information, the first information is used to indicate an uplink control channel resource for carrying uplink control information, the uplink control channel resource belongs to a first uplink control channel resource set, the first uplink control channel resource set includes a second uplink control channel resource set and a third uplink control channel resource set, resource indexes corresponding to uplink control channel resources included in the second uplink control channel resource set are sorted in a manner of frequency domain first and time domain second, and resource indexes corresponding to uplink control channel resources included in the third uplink control channel resource set are sorted in frequency domain; the terminal device determines, based on the first information, the uplink control channel resource for carrying uplink control information; and the terminal device sends uplink control information to a network device by using the uplink control channel resource.

According to the information transmission method provided in the third aspect, a resource index corresponding to the reserved uplink control channel resource that is used to carry uplink control information and that is indicated by the first information is not fixed, but may be changed based on different sorting manners. In other words, an uplink control channel resource that is used to transmit uplink control information in each subframe may be flexibly changed. Therefore, the first information may be used to flexibly reserve and indicate the uplink control channel resource that is used to transmit uplink control information in each subframe. In this way, configuration flexibility of the uplink control channel resource is improved.

Optionally, in a possible implementation of the third aspect, a quantity of symbols corresponding to the uplink control channel resource included in the second uplink control channel resource set is less than a quantity of symbols corresponding to the uplink control channel resource included in the third uplink control channel resource set.

Optionally, in a possible implementation of the third aspect, the downlink control information further includes fourth information, and that the terminal device determines, based on the first information, the uplink control channel resource for carrying uplink control information includes: The terminal device determines, based on the fourth information, a resource set to which the uplink control channel resource for carrying uplink control information belongs, where the resource set to which the uplink control channel resource belongs is the second uplink control channel resource set or the third uplink control channel resource set; and the terminal device determines, based on the first information and the resource set to which the uplink control channel resource belongs, the uplink control channel resource for carrying uplink control information.

According to a fourth aspect, an embodiment of this application provides an information transmission method, where the method includes: A network device sends downlink control information, where the downlink control information includes first information, the first information is used to indicate an uplink control channel resource for carrying uplink control information, the uplink control channel resource belongs to a first uplink control channel resource set, the first uplink control channel resource set includes a second uplink control channel resource set and a third uplink control channel resource set, resource indexes corresponding to uplink control channel resources included in the second uplink control channel resource set are sorted in a manner of frequency domain first and time domain second, and resource indexes corresponding to uplink control channel resources included in the third uplink control channel resource set are sorted in frequency domain; and the network device receives, on the uplink control channel resource for carrying uplink control information, uplink control information sent by a terminal device.

According to the information transmission method provided in the fourth aspect, a resource index corresponding to the reserved uplink control channel resource that is used to carry uplink control information and that is indicated by the first information is not fixed, but may be changed based on different sorting manners. Therefore, the first information may be used to flexibly reserve and indicate an uplink control channel resource that is used to transmit uplink control information in each subframe. In this way, configuration flexibility of the uplink control channel resource is improved.

Optionally, in a possible implementation of the fourth aspect, the downlink control information further includes fourth information, the fourth information is used to indicate a resource set to which the uplink control channel resource for carrying uplink control information belongs, and the resource set to which the uplink control channel resource belongs is the second uplink control channel resource set or the third uplink control channel resource set.

According to a fifth aspect, an embodiment of this application provides an information transmission method, where the method may include: A terminal device receives downlink control information, where the downlink control information includes first information, the first information is used to indicate an uplink control channel resource for carrying uplink control information, the uplink control channel resource belongs to a first uplink control channel resource set, the first uplink control channel resource set includes a fourth uplink control channel resource set and a fifth uplink control channel resource set, an uplink control channel resource included in the fourth uplink control channel resource set corresponds to a first slot, and an uplink control channel resource included in the fifth uplink control channel resource set corresponds to a second slot; the terminal device determines, based on the first information, the uplink control channel resource for carrying uplink control information; and the terminal device sends uplink control information to a network device by using the uplink control channel resource.

According to the information transmission method provided in the fifth aspect, a slot corresponding to the reserved uplink control channel resource that is used to carry uplink control information and that is indicated by the first information is not fixed, but may be changed. In other words, an uplink control channel resource that is used to transmit uplink control information in each subframe may be flexibly changed. Therefore, the first information may be used to flexibly reserve and indicate the uplink control channel resource that is used to transmit uplink control information in each subframe. In this way, configuration flexibility of the uplink control channel resource is improved.

Optionally, in a possible implementation of the fifth aspect, the first slot and the second slot belong to a same subframe.

According to a sixth aspect, an embodiment of this application provides an information transmission method, where the method may include: A network device sends downlink control information, where the downlink control information includes first information, the first information is used to indicate an uplink control channel resource for carrying uplink control information, the uplink control channel resource belongs to a first uplink control channel resource set, the first uplink control channel resource set includes a fourth uplink control channel resource set and a fifth uplink control channel resource set, an uplink control channel resource included in the fourth uplink control channel resource set corresponds to a first slot, and an uplink control channel resource included in the fifth uplink control channel resource set corresponds to a second slot; and the network device receives, on the uplink control channel resource for carrying uplink control information, uplink control information sent by a terminal device.

According to the information transmission method provided in the sixth aspect, a slot corresponding to the reserved uplink control channel resource that is used to carry uplink control information and that is indicated by the first information is not fixed, but may be changed. In other words, an uplink control channel resource that is used to transmit uplink control information in each subframe may be flexibly changed. Therefore, the first information may be used to flexibly reserve and indicate the uplink control channel resource that is used to transmit uplink control information in each subframe. In this way, configuration flexibility of the uplink control channel resource is improved.

Optionally, in a possible implementation of the sixth aspect, the first slot and the second slot belong to a same subframe.

According to a seventh aspect, an embodiment of this application provides a terminal apparatus, where the terminal apparatus may include: a transceiver unit, configured to receive downlink control information, where the downlink control information includes first information, the first information is used to indicate an uplink control channel resource for carrying uplink control information, the uplink control channel resource belongs to a first uplink control channel resource set, and the first uplink control channel resource set includes at least two uplink control channel resources that correspond to different quantities of symbols, or includes at least two uplink control channel resources that correspond to different quantities of resource blocks; and a processing unit, configured to determine, based on the first information, the uplink control channel resource for carrying uplink control information, where the transceiver unit is further configured to send uplink control information to a network device by using the uplink control channel resource.

Optionally, in a possible implementation of the seventh aspect, the transceiver unit is further configured to receive higher layer signaling; and the processing unit is further configured to determine the first uplink control channel resource set based on the higher layer signaling.

Optionally, in a possible implementation of the seventh aspect, the processing unit is specifically configured to: determine, based on the higher layer signaling, quantities of symbols corresponding to uplink control channel resources in the first uplink control channel resource set; or determine, based on the higher layer signaling, quantities of resource blocks corresponding to uplink control channel resources in the first uplink control channel resource set.

Optionally, in a possible implementation of the seventh aspect, that the first uplink control channel resource set includes at least two uplink control channel resources that correspond to different quantities of symbols includes: The first uplink control channel resource set includes a first uplink control channel resource, and the first uplink control channel resource corresponds to one symbol; and the first uplink control channel resource set further includes a second uplink control channel resource, and the second uplink control channel resource corresponds to two symbols.

Optionally, in a possible implementation of the seventh aspect, that the first uplink control channel resource set includes at least two uplink control channel resources that correspond to different quantities of symbols includes: The first uplink control channel resource set includes a third uplink control channel resource, and the third uplink control channel resource corresponds to seven symbols; and the first uplink control channel resource set further includes a fourth uplink control channel resource, and the fourth uplink control channel resource corresponds to 14 symbols.

According to an eighth aspect, an embodiment of this application provides a network apparatus, where the network apparatus may include: a transceiver unit, configured to send downlink control information, where the downlink control information includes first information, the first information is used to indicate an uplink control channel resource for carrying uplink control information, the uplink control channel resource belongs to a first uplink control channel resource set, and the first uplink control channel resource set includes at least two uplink control channel resources that correspond to different quantities of symbols, or includes at least two uplink control channel resources that correspond to different quantities of resource blocks, where the transceiver unit is further configured to receive, on the uplink control channel resource for carrying uplink control information, uplink control information sent by a terminal device.

Optionally, in a possible implementation of the eighth aspect, the transceiver unit is further configured to send higher layer signaling, where the higher layer signaling is used to indicate the first uplink control channel resource set.

Optionally, in a possible implementation of the eighth aspect, that the higher layer signaling is used to indicate the first uplink control channel resource set includes: The higher layer signaling is used to indicate quantities of symbols corresponding to uplink control channel resources in the first uplink control channel resource set; or the higher layer signaling is used to indicate quantities of resource blocks corresponding to uplink control channel resources in the first uplink control channel resource set.

Optionally, in a possible implementation of the eighth aspect, that the first uplink control channel resource set includes at least two uplink control channel resources that correspond to different quantities of symbols includes: The first uplink control channel resource set includes a first uplink control channel resource, and the first uplink control channel resource corresponds to one symbol; and the first uplink control channel resource set further includes a second uplink control channel resource, and the second uplink control channel resource corresponds to two symbols.

Optionally, in a possible implementation of the eighth aspect, that the first uplink control channel resource set includes at least two uplink control channel resources that correspond to different quantities of symbols includes: The first uplink control channel resource set includes a third uplink control channel resource, and the third uplink control channel resource corresponds to seven symbols; and the first uplink control channel resource set further includes a fourth uplink control channel resource, and the fourth uplink control channel resource corresponds to 14 symbols.

According to a ninth aspect, an embodiment of this application provides a terminal apparatus, where the terminal apparatus may include: a transceiver unit, configured to receive downlink control information, where the downlink control information includes first information, the first information is used to indicate an uplink control channel resource for carrying uplink control information, the uplink control channel resource belongs to a first uplink control channel resource set, the first uplink control channel resource set includes a second uplink control channel resource set and a third uplink control channel resource set, resource indexes corresponding to uplink control channel resources included in the second uplink control channel resource set are sorted in a manner of frequency domain first and time domain second, and resource indexes corresponding to uplink control channel resources included in the third uplink control channel resource set are sorted in frequency domain; and a processing unit, configured to determine, based on the first information, the uplink control channel resource for carrying uplink control information, where the transceiver unit is further configured to send uplink control information to a network device by using the uplink control channel resource.

Optionally, in a possible implementation of the ninth aspect, a quantity of symbols corresponding to the uplink control channel resource included in the second uplink control channel resource set is less than a quantity of symbols corresponding to the uplink control channel resource included in the third uplink control channel resource set.

Optionally, in a possible implementation of the ninth aspect, the downlink control information further includes fourth information, and the processing unit is specifically configured to: determine, based on the fourth information, a resource set to which the uplink control channel resource for carrying uplink control information belongs, where the resource set to which the uplink control channel resource belongs is the second uplink control channel resource set or the third uplink control channel resource set; and determine, based on the first information and the resource set to which the uplink control channel resource belongs, the uplink control channel resource for carrying uplink control information.

According to a tenth aspect, an embodiment of this application provides a network device, where the network device may include: a transceiver unit, configured to send downlink control information, where the downlink control information includes first information, the first information is used to indicate an uplink control channel resource for carrying uplink control information, the uplink control channel resource belongs to a first uplink control channel resource set, the first uplink control channel resource set includes a second uplink control channel resource set and a third uplink control channel resource set, resource indexes corresponding to uplink control channel resources included in the second uplink control channel resource set are sorted in a manner of frequency domain first and time domain second, and resource indexes corresponding to uplink control channel resources included in the third uplink control channel resource set are sorted in frequency domain, where the transceiver unit is further configured to receive, on the uplink control channel resource for carrying uplink control information, uplink control information sent by a terminal device.

Optionally, in a possible implementation of the tenth aspect, the downlink control information further includes fourth information, the fourth information is used to indicate a resource set to which the uplink control channel resource for carrying uplink control information belongs, and the resource set to which the uplink control channel resource belongs is the second uplink control channel resource set or the third uplink control channel resource set.

According to an eleventh aspect, an embodiment of this application provides a terminal device, where the terminal device may include: a transceiver unit, configured to receive downlink control information, where the downlink control information includes first information, the first information is used to indicate an uplink control channel resource for carrying uplink control information, the uplink control channel resource belongs to a first uplink control channel resource set, the first uplink control channel resource set includes a fourth uplink control channel resource set and a fifth uplink control channel resource set, an uplink control channel resource included in the fourth uplink control channel resource set corresponds to a first slot, and an uplink control channel resource included in the fifth uplink control channel resource set corresponds to a second slot; and a processing unit, configured to determine, based on the first information, the uplink control channel resource for carrying uplink control information, where the transceiver unit is further configured to send uplink control information to a network device by using the uplink control channel resource.

Optionally, in a possible implementation of the eleventh aspect, the first slot and the second slot belong to a same subframe.

According to a twelfth aspect, an embodiment of this application provides a network device, where the network device may include: a transceiver unit, configured to send downlink control information, where the downlink control information includes first information, the first information is used to indicate an uplink control channel resource for carrying uplink control information, the uplink control channel resource belongs to a first uplink control channel resource set, the first uplink control channel resource set includes a fourth uplink control channel resource set and a fifth uplink control channel resource set, an uplink control channel resource included in the fourth uplink control channel resource set corresponds to a first slot, and an uplink control channel resource included in the fifth uplink control channel resource set corresponds to a second slot, where the transceiver unit is further configured to receive, on the uplink control channel resource for carrying uplink control information, uplink control information sent by a terminal device.

Optionally, in a possible implementation of the twelfth aspect, the first slot and the second slot belong to a same subframe.

The embodiments of this application provide the information transmission method, the terminal device, and the network device. The information transmission method may include: The network device sends the downlink control information, where the downlink control information includes the first information; the terminal device receives the downlink control information, determines, based on the first information, the uplink control channel resource for carrying uplink control information, and sends the uplink control information to the network device by using the uplink control channel resource; and the network device receives, on the uplink control channel resource for carrying uplink control information, the uplink control information sent by the terminal device. Therefore, according to the information transmission method provided in the embodiments of this application, the first information may be used to flexibly reserve and indicate the uplink control channel resource that is used to transmit uplink control information in each subframe. In this way, configuration flexibility of the uplink control channel resource is improved, and system resource utilization is improved.

DESCRIPTION OF EMBODIMENTS

Figure 1:
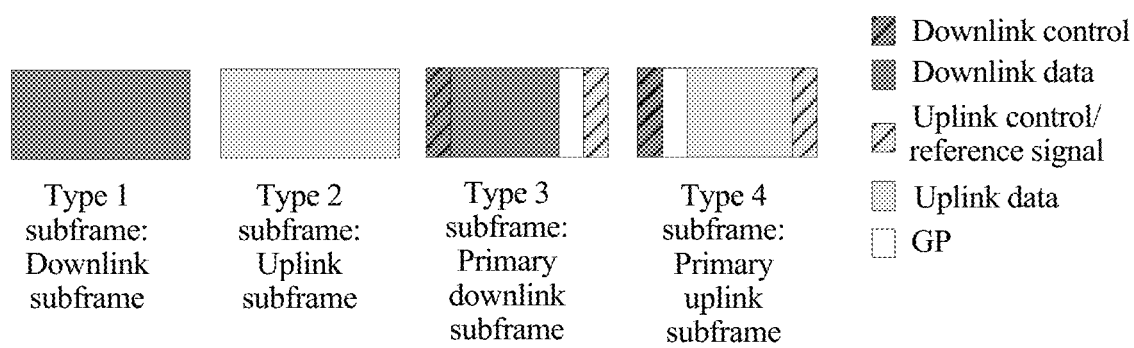
FIG. 1 is a schematic diagram of subframe types in a 5G communications system.

A terminal device (also referred to as user equipment (UE)) in embodiments of this application may be a wireless terminal such as a mobile phone or a tablet computer. The wireless terminal includes a device that provides a voice and/or data service to a user. Optionally, the device may be a handheld device with a wireless connection function or another processing device that is connected to a wireless modem. In addition, the wireless terminal may communicate with one or more core networks by using a radio access network (RAN). For example, the wireless terminal may be specifically a mobile terminal, such as a mobile phone (or referred to as a "cellular" phone) and a computer with a mobile terminal. The computer with a mobile terminal may be a portable, pocket-sized, handheld, computer built-in, or in-vehicle mobile apparatus that can exchange voice and/or data with the core network. For example, the computer with a mobile terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal, an access terminal, a user terminal, a user agent, a user device, or user equipment. Alternatively, the terminal device in the embodiments of this application may be a vehicle or the like in Vehicle to X (V2X) communication.

A network device in the embodiments of this application may be any device in a cellular communications network, for example, a base station (such as an access point), and the base station may be a device that is in an access network and that communicates with the wireless terminal over an air interface by using one or more sectors. The base station may be configured to mutually convert a received over-the-air frame and an IP packet and serve as a router between the wireless terminal and a remaining part of the access network, where the remaining part of the access network may include an Internet Protocol (IP) network. The base station may further coordinate attribute management of the air interface. For example, the base station may be a base transceiver station (BTS) in GSM or CDMA, or may be a NodeB in WCDMA, or may be an evolved NodeB (eNB or e-NodeB) in LTE, and this is not limited in the embodiments of this application.

An information transmission method provided in the embodiments of this application may be applied to a terminal device and a network device in a 5G communications system, a Long Term Evolution (LTE) communications system, and an evolved LTE communications system, and the information transmission method may be applied to a single-carrier scenario or a carrier aggregation scenario. Certainly, the information transmission method in the embodiments of this application includes but is not limited to the foregoing application scenarios. The information transmission method provided in the embodiments of this application can be used in any scenario in which an uplink control channel resource is dynamically reserved and indicated.

A frame structure corresponding to the 5G communications system may include four subframe types shown in FIG. 1. FIG. 1 is a schematic diagram of subframe types in a 5G communications system. As shown in FIG. 1, a type 1 subframe is a downlink subframe, a type 2 subframe is an uplink subframe, and a type 3 subframe and a type 4 subframe each include a symbol used for downlink transmission, a guard period (GP), and a symbol used for uplink transmission. The type 3 subframe and the type 4 subframe may be classified under a same type of subframe. In the type 3 subframe, the symbol used for downlink transmission is mainly used for downlink control channel transmission and downlink data transmission, and the symbol used for uplink transmission is mainly used for transmission of uplink control information and/or an uplink reference signal (for example, a sounding reference signal (SRS)). In the type 4 subframe, the symbol used for downlink transmission is mainly used for downlink control channel transmission, and the symbol used for uplink transmission is mainly used for transmission of uplink data, uplink control information, and an uplink reference signal. The type 3 subframe may also be referred to as a primary downlink subframe (also referred to as a DL dominant subframe or a DL centric subframe). The type 4 subframe may also be referred to as a primary uplink subframe (also referred to as a UL dominant subframe or a UL centric subframe). In the type 3 subframe, a quantity of time-domain symbols used for downlink transmission may be greater than or equal to a quantity of time-domain symbols used for uplink transmission. In the type 4 subframe, a quantity of time-domain symbols used for downlink transmission may be less than a quantity of time-domain symbols used for uplink transmission.

It should be noted that the subframe type in all the embodiments of this application may also be referred to as a slot type. In this case, the type 1 subframe may be referred to as a type 1 slot and may be a downlink slot; the type 2 subframe may be referred to as a type 2 slot and may be an uplink slot; the type 3 subframe may be referred to as a type 3 slot; and the type 4 subframe may be referred to as a type 4 slot.

It should be noted that a slot and a subframe in all the embodiments of this application may be equal or may not be equal in length in time domain.

It should be noted that the subframe type in all the embodiments of this application may also be referred to as a time-domain structure. In this case, the type 1 subframe may be referred to as a first time-domain structure, the type 2 subframe may be referred to as a second time-domain structure, the type 3 subframe may be referred to as a third time-domain structure, and the type 4 subframe may be referred to as a fourth time-domain structure.

The information transmission method, the terminal device, and the network device provided in the embodiments of this application are intended to resolve a prior-art technical problem of inability to flexibly reserve and indicate an uplink control channel resource in a subframe, to perform fast HARQ-ACK feedback and fast retransmission and adapt to flexible HARQ timing.

The following describes technical solutions of this application in detail by using specific embodiments. The following specific embodiments may be mutually combined, and same or similar concepts or processes may not be described again in some embodiments.

Figure 2:
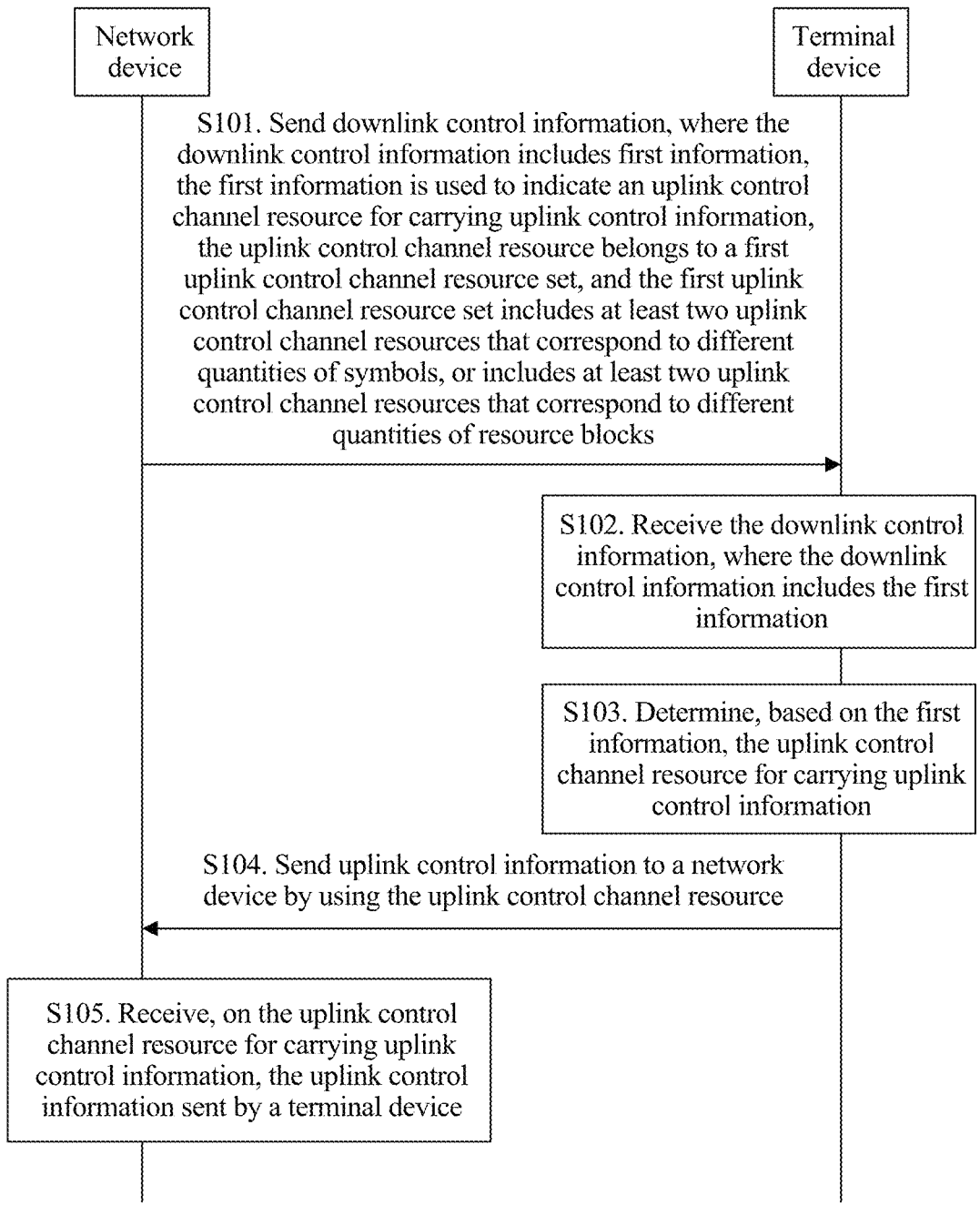
FIG. 2 is a schematic flowchart of Embodiment 1 of an information transmission method according to an embodiment of this application.

FIG. 2 is a schematic flowchart of Embodiment 1 of an information transmission method according to an embodiment of this application. As shown in FIG. 2, the information transmission method provided in this embodiment of this application may include the following steps.

S101. A network device sends downlink control information, where the downlink control information includes first information.

The first information is used to indicate an uplink control channel resource for carrying uplink control information.

The uplink control channel resource belongs to a first uplink control channel resource set, and the first uplink control channel resource set includes at least two uplink control channel resources that correspond to different quantities of symbols, or includes at least two uplink control channel resources that correspond to different quantities of resource blocks.

Specifically, the network device sends the downlink control information to a terminal device, where the downlink control information includes the first information, the first information indicates the uplink control channel resource, and the uplink control channel resource is used to carry uplink control information. The uplink control channel resource belongs to the first uplink control channel resource set, the first uplink control channel resource set includes at least two uplink control channel resources, and the at least two uplink control channel resources correspond to different quantities of symbols or correspond to different quantities of resource blocks. In other words, a quantity of symbols or resource blocks corresponding to the reserved uplink control channel resource that is used to carry uplink control information and that is indicated by the first information is not fixed, but may be changed. In other words, an uplink control channel resource that is used to transmit uplink control information in each subframe may be flexibly changed.

It can be learned that, compared with the prior art in which a fixed uplink control channel resource is reserved, in the information transmission method provided in this embodiment of this application, the first information may be used to flexibly reserve and indicate the uplink control channel resource that is used to transmit uplink control information in each subframe. In this way, configuration flexibility of the uplink control channel resource is improved.

In addition, because the uplink control channel resource that is used to transmit an uplink control channel in each subframe may be flexibly reserved and indicated, a size of the uplink control channel resource may be changed based on a quantity of uplink control information feedbacks, so that a waste of resources or a lack of resources is avoided, and system resource utilization is improved.

It should be noted that different uplink control channel resources that correspond to different quantities of resource blocks may correspond to a same quantity of symbols or different quantities of symbols.

For example, an uplink control channel resource corresponding to one resource block corresponds to two symbols; or an uplink control channel resource corresponding to two resource blocks corresponds to two symbols; or an uplink control channel resource corresponding to two resource blocks corresponds to one symbol.

It should be noted that the resource block in this embodiment of this application may correspond to one slot or one subframe in length in time domain. When the resource block corresponds to one subframe in length in time domain, the resource block may also be referred to as a resource block pair, and the quantity of resource blocks may also be referred to as a quantity of resource block pairs. In this embodiment of this application, alternatively, the resource block may be only one or more symbols in length in time domain, for example, may be one symbol, or may be two symbols. Definitions of the subframe and the slot may vary according to different communications systems. This embodiment of this application imposes no special limitation on the definitions of the subframe and the slot and a correspondence.

It should be noted that the subframe in this embodiment of this application may be replaced with a transmission time unit, or may be replaced with a transmission time interval, or may be replaced with a resource element. This embodiment of this application imposes no special limitation thereto. Alternatively, the subframe in this embodiment of this application may be replaced with the slot.

It should be noted that the symbol in this embodiment of this application may be a time-domain symbol, for example, may be an orthogonal frequency division multiplexing (OFDM) symbol, or may be a single-carrier frequency division multiple access (SC-FDMA) symbol.

Optionally, that the first uplink control channel resource set includes at least two uplink control channel resources that correspond to different quantities of symbols may have the following four implementations.

First implementation:

The first uplink control channel resource set includes a first uplink control channel resource, and the first uplink control channel resource corresponds to one symbol; and the first uplink control channel resource set further includes a second uplink control channel resource, and the second uplink control channel resource corresponds to two symbols.

Second implementation:

The first uplink control channel resource set includes a third uplink control channel resource, and the third uplink control channel resource corresponds to seven symbols; and the first uplink control channel resource set further includes a fourth uplink control channel resource, and the fourth uplink control channel resource corresponds to 14 symbols.

Third implementation:

The first uplink control channel resource set includes a first uplink control channel resource, and the first uplink control channel resource corresponds to one symbol;

the first uplink control channel resource set further includes a second uplink control channel resource, and the second uplink control channel resource corresponds to two symbols;

the first uplink control channel resource set further includes a third uplink control channel resource, and the third uplink control channel resource corresponds to seven symbols; and the first uplink control channel resource set further includes a fourth uplink control channel resource, and the fourth uplink control channel resource corresponds to 14 symbols.

Fourth implementation:

The first uplink control channel resource set includes a first uplink control channel resource, and the first uplink control channel resource corresponds to one symbol;

the first uplink control channel resource set further includes a second uplink control channel resource, and the second uplink control channel resource corresponds to two symbols;

the first uplink control channel resource set further includes a fifth uplink control channel resource, and a third uplink control channel resource corresponds to three symbols; and the first uplink control channel resource set further includes a sixth uplink control channel resource, and a fourth uplink control channel resource corresponds to four symbols.

Specifically, the first uplink control channel resource set may include two uplink control channel resources that respectively correspond to one symbol and two symbols, or seven symbols and 14 symbols; or the first uplink control channel resource set may include four uplink control channel resources that respectively correspond to one symbol, two symbols, seven symbols, and 14 symbols, or one symbol, two symbols, three symbols, and four symbols. The quantity of symbols corresponding to the uplink control channel resource that is used to carry uplink control information and that is indicated by the first information may be any one of the foregoing implementations. Therefore, the first information may be used to flexibly reserve and indicate the quantity of symbols of the uplink control channel resource. In this way, configuration flexibility of the uplink control channel resource is improved.

It should be noted that in this embodiment of this application, an implementation of a quantity of symbols corresponding to an uplink control channel resource in the first uplink control channel resource set is not limited to the foregoing four implementations, but may further include another implementation.

Optionally, that the first uplink control channel resource set includes at least two uplink control channel resources that correspond to different quantities of resource blocks may have the following three implementations.

First implementation:

The first uplink control channel resource set includes a seventh uplink control channel resource, and the seventh uplink control channel resource corresponds to one resource block; and the first uplink control channel resource set further includes an eighth uplink control channel resource, and the eighth uplink control channel resource corresponds to two resource blocks.

Second implementation:

The first uplink control channel resource set includes a ninth uplink control channel resource, and the ninth uplink control channel resource corresponds to three resource blocks; and the first uplink control channel resource set further includes a tenth uplink control channel resource, and the tenth uplink control channel resource corresponds to four resource blocks.

Third implementation:

The first uplink control channel resource set includes a seventh uplink control channel resource, and the seventh uplink control channel resource corresponds to one resource block;

the first uplink control channel resource set further includes an eighth uplink control channel resource, and the eighth uplink control channel resource corresponds to two resource blocks;

the first uplink control channel resource set further includes a ninth uplink control channel resource, and the ninth uplink control channel resource corresponds to three resource blocks; and the first uplink control channel resource set further includes a tenth uplink control channel resource, and the tenth uplink control channel resource corresponds to four resource blocks.

Specifically, the first uplink control channel resource set may include two uplink control channel resources that respectively correspond to one resource block and two resource blocks, or three resource blocks and four resource blocks; or the first uplink control channel resource set may include four uplink control channel resources that respectively correspond to one resource block, two resource blocks, three resource blocks, and four resource blocks. The quantity of resource blocks corresponding to the uplink control channel resource that is used to carry uplink control information and that is indicated by the first information may be any one of the foregoing implementations. Therefore, the first information may be used to flexibly reserve and indicate the quantity of resource blocks of the uplink control channel resource. In this way, configuration flexibility of the uplink control channel resource is improved.

It should be noted that in this embodiment of this application, an implementation of a quantity of resource blocks corresponding to an uplink control channel resource in the first uplink control channel resource set is not limited to merely the foregoing three implementations, but may further include another implementation.

Optionally, the first uplink control channel resource set may include at least two uplink control channel resources that correspond to different symbols.

Optionally, that the at least two uplink control channel resources correspond to different symbols may be that the at least two uplink control channel resources correspond to different symbol positions or correspond to different quantities of symbols.

For example, the first uplink control channel resource set includes two uplink control channel resources that each correspond to one symbol. One uplink control channel resource is carried on a last symbol in a subframe, and the other uplink control channel resource is carried on a last-but-one symbol in the subframe.

Optionally, that a network device sends downlink control information, where the downlink control information includes first information, and the first information is used to indicate an uplink control channel resource for carrying uplink control information in S101 may have the following three implementations.

First implementation: The network device sends a downlink control channel, where downlink control information carried on the downlink control channel includes first information, and the first information is used to indicate an uplink control channel resource for carrying uplink control information.

Second implementation: The network device sends a downlink control channel, where a downlink control information format corresponding to the downlink control channel includes a first information field, and the first information field is used to indicate an uplink control channel resource for carrying uplink control information.

Third implementation: The network device sends a downlink control information format, where the downlink control information format includes a first information field, and the first information field is used to indicate an uplink control channel resource for carrying uplink control information.

Optionally, the uplink control channel resource may be a time-frequency domain resource and/or a code resource corresponding to an uplink control channel. The code resource may be a cyclic shift and/or an orthogonal spreading code of a sequence corresponding to the uplink control channel.

Optionally, that the first information is used to indicate an uplink control channel resource for carrying uplink control information may include:

The first information is used to indicate a resource index corresponding to the uplink control channel resource for carrying uplink control information, and the resource index corresponding to the uplink control channel resource is used by the terminal device to determine, based on the resource index, the time-frequency domain resource and/or the code resource corresponding to the uplink control channel.

Further, in this embodiment of this application, S101 may further include:

The network device sends higher layer signaling, where the higher layer signaling is used to indicate the first uplink control channel resource set.

Specifically, the network device may flexibly configure a quantity of required symbols or resource blocks to meet different scenario requirements and different service transmission requirements, and the network device may configure all uplink control channel resources included in the first uplink control channel resource set for the terminal device by using the higher layer signaling. In this way, configuration flexibility of the uplink control channel resource is further improved, and uplink control information transmission performance is ensured.

Optionally, that the higher layer signaling is used to indicate the first uplink control channel resource set may include:

The higher layer signaling is used to indicate quantities of symbols corresponding to uplink control channel resources in the first uplink control channel resource set; or the higher layer signaling is used to indicate quantities of resource blocks corresponding to uplink control channel resources in the first uplink control channel resource set.

Optionally, that the higher layer signaling is used to indicate the first uplink control channel resource set may include:

The higher layer signaling is used to indicate symbols corresponding to uplink control channel resources in the first uplink control channel resource set.

Further, in this embodiment of this application, S101 may further include:

The network device determines the uplink control channel resource for carrying uplink control information; and the network device determines the first information in the downlink control information based on the uplink control channel resource for carrying uplink control information.

Specifically, the foregoing step provides an implementation of determining the first information by the network device. The network device first determines the uplink control channel resource for carrying uplink control information, and then determines the first information in the downlink control information based on the uplink control channel resource.

The network device may determine the uplink control channel resource based on different application scenarios and different service requirements, and the first information is used to indicate the uplink control channel resource, to flexibly match different application scenarios and different services.

It should be noted that this embodiment of this application imposes no special limitation on a specific implementation of the first information, and the first information is set based on a requirement.

Optionally, in a specific implementation, if the first information corresponds to a 2-bit information field, that the network device determines the first information in the downlink control information based on the uplink control channel resource for carrying uplink control information may include:

If the uplink control channel resource for carrying uplink control information is the $1^{st}$ uplink control channel resource, the network device determines that the 2-bit information field corresponding to the first information is 00;

if the uplink control channel resource for carrying uplink control information is the $2^{nd}$ uplink control channel resource, the network device determines that the 2-bit information field corresponding to the first information is 01;

if the uplink control channel resource for carrying uplink control information is the $3^{rd}$ uplink control channel resource, the network device determines that the 2-bit information field corresponding to the first information is 10; or if the uplink control channel resource for carrying uplink control information is the $4^{th}$ uplink control channel resource, the network device determines that the 2-bit information field corresponding to the first information is 11.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the $1^{st}$ uplink control channel resource, the $2^{nd}$ uplink control channel resource, the $3^{rd}$ uplink control channel resource, and the $4^{th}$ uplink control channel resource each includes at least two uplink control channel resources that correspond to different quantities of symbols, or correspond to different quantities of resource blocks, or correspond to different symbols.

Further, the downlink control information may further include second information, and the second information is used to indicate a subframe for carrying uplink control information.

Specifically, if the downlink control information is carried in a subframe n, the uplink control information is carried in a subframe n+k, where n is an integer greater than or equal to 0, k is an integer greater than or equal to 0, and a value of k is determined based on the second information.

It can be learned that when k is equal to 0, the downlink control information and the uplink control information may be carried in a same subframe, so that fast HARQ retransmission can be performed and a service requirement for a relatively small latency can be met; and when k is greater than 0, the uplink control information is carried in a subframe following a subframe in which the downlink control information is carried, so that a requirement of a service that does not have a strict latency requirement can be met.

Further, the downlink control information may further include third information, the third information is used to trigger reporting of channel state information, and the uplink control information is the channel state information.

It should be noted that this embodiment of this application imposes no special limitation on a definition and an implementation of the channel state information. For example, the channel state information may include channel quality information, a code matrix indication, a layer quantity indication, and beam related information.

Optionally, the downlink control information is used to schedule a downlink shared channel transmission, and the uplink control information is a hybrid automatic repeat request feedback corresponding to the downlink shared channel transmission.

S102. A terminal device receives the downlink control information, where the downlink control information includes the first information.

The first information is used to indicate the uplink control channel resource for carrying uplink control information.

The uplink control channel resource belongs to the first uplink control channel resource set, and the first uplink control channel resource set includes at least two uplink control channel resources that correspond to different quantities of symbols, or includes at least two uplink control channel resources that correspond to different quantities of resource blocks.

Specifically, the terminal device receives the downlink control information sent by the network device, where the downlink control information includes the first information, the first information indicates the uplink control channel resource, and the uplink control channel resource is used to carry uplink control information. The uplink control channel resource belongs to the first uplink control channel resource set, the first uplink control channel resource set includes at least two uplink control channel resources, and the at least two uplink control channel resources correspond to different quantities of symbols or correspond to different quantities of resource blocks. In other words, a quantity of symbols or resource blocks corresponding to the reserved uplink control channel resource that is used to carry uplink control information and that is indicated by the first information is not fixed, but may be changed. In other words, an uplink control channel resource that is used to transmit uplink control information in each subframe may be flexibly changed.

Therefore, compared with the prior art in which a fixed uplink control channel resource is reserved, in the information transmission method provided in this embodiment of this application, the first information may be used to flexibly reserve and indicate the uplink control channel resource that is used to transmit uplink control information in each subframe. In this way, configuration flexibility of the uplink control channel resource is improved.

In addition, because the uplink control channel resource that is used to transmit an uplink control channel in each subframe may be flexibly reserved and indicated, a size of the uplink control channel resource may be changed based on a quantity of uplink control information feedbacks, so that a waste of resources or a lack of resources is avoided, and system resource utilization is improved.

Optionally, that a terminal device receives the downlink control information, where the downlink control information includes the first information, and the first information is used to indicate the uplink control channel resource for carrying uplink control information in S102 may have the following three implementations.

First implementation: The terminal device receives a downlink control channel, where downlink control information carried on the downlink control channel includes first information, and the first information is used to indicate an uplink control channel resource for carrying uplink control information.

Second implementation: The terminal device receives a downlink control channel, where a downlink control information format corresponding to the downlink control channel includes a first information field, and the first information field is used to indicate an uplink control channel resource for carrying uplink control information.

Third implementation: The terminal device detects a downlink control information format, where the downlink control information format includes a first information field, and the first information field is used to indicate an uplink control channel resource for carrying uplink control information.

Further, in this embodiment of this application, S102 may further include:

The terminal device receives the higher layer signaling; and the terminal device determines the first uplink control channel resource set based on the higher layer signaling.

Specifically, the terminal device receives the higher layer signaling sent by the network device, and the terminal device may learn of, by using the higher layer signaling, all uplink control channel resources included in the first uplink control channel resource set that are configured by the network device. Because the terminal device may learn of a quantity of symbols or resource blocks that is flexibly configured by the network device based on different scenario requirements and different service requirements, configuration flexibility of the uplink control channel resource is further improved, and uplink control information transmission performance is ensured.

Optionally, that the terminal device determines the first uplink control channel resource set based on the higher layer signaling may have the following three implementations.

First implementation: The terminal device determines, based on the higher layer signaling, quantities of symbols corresponding to uplink control channel resources in the first uplink control channel resource set, or quantities of resource blocks corresponding to uplink control channel resources in the first uplink control channel resource set.

Second implementation: The terminal device determines, based on the higher layer signaling, resource indexes corresponding to uplink control channel resources in the first uplink control channel resource set.

Third implementation: The terminal device determines, based on the higher layer signaling, resource indexes corresponding to uplink control channel resources in the first uplink control channel resource set; and the terminal device determines, based on the resource indexes, quantities of symbols or resource blocks corresponding to the resource indexes.

Optionally, if the first information corresponds to a 2-bit information field, that the first information is used to indicate the uplink control channel resource for carrying uplink control information may be as follows:

If the 2-bit information field corresponding to the first information is 00, the uplink control channel resource for carrying uplink control information is the $1^{st}$ uplink control channel resource;
- if the 2-bit information field corresponding to the first information is 01, the uplink control channel resource for carrying uplink control information is the $2^{nd}$ uplink control channel resource;
- if the 2-bit information field corresponding to the first information is 10, the uplink control channel resource for carrying uplink control information is the $3^{rd}$ uplink control channel resource; or
- if the 2-bit information field corresponding to the first information is 11, the uplink control channel resource for carrying uplink control information is the $4^{th}$ uplink control channel resource.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the four uplink control channel resources including the $1^{st}$ uplink control channel resource, the $2^{nd}$ uplink control channel resource, the $3^{rd}$ uplink control channel resource, and the $4^{th}$ uplink control channel resource each includes at least two uplink control channel resources that correspond to different quantities of symbols, or correspond to different quantities of resource blocks, or correspond to different symbols.

It should be noted that in this step, descriptions of the downlink control information, the uplink control information, the uplink control channel resource, the first uplink control channel resource set, the first information, the symbol, the resource block, the slot, the subframe, and other aspects are the same as those in S101 in this embodiment of this application, and principles are similar. Details are not described herein again.

S103. The terminal device determines, based on the first information, an uplink control channel resource for carrying uplink control information.

Optionally, that the terminal device determines, based on the first information, an uplink control channel resource for carrying uplink control information in S103 may have the following two implementations.

First implementation:

The terminal device determines, based on the first information, a resource index corresponding to the uplink control channel resource for carrying uplink control information; and
the terminal device determines, based on the resource index corresponding to the uplink control channel resource, a time-frequency domain resource and/or a code resource corresponding to the uplink control channel.

Second implementation:

The terminal device determines, based on the first information, a resource index corresponding to an uplink control channel for carrying uplink control information on a symbol for carrying uplink control information; and
the terminal device determines, based on the resource index corresponding to the uplink control channel resource, a time-frequency domain resource and/or a code resource corresponding to the uplink control channel.

Optionally, if the first information corresponds to a 2-bit information field, that the terminal device determines, based on the first information, an uplink control channel resource for carrying uplink control information may include:

If the 2-bit information field corresponding to the first information is 00, the terminal device determines that the uplink control channel resource for carrying uplink control information is the $1^{st}$ uplink control channel resource configured by using the higher layer signaling;
- if the 2-bit information field corresponding to the first information is 01, the terminal device determines that the uplink control channel resource for carrying uplink control information is the $2^{nd}$ uplink control channel resource configured by using the higher layer signaling;
- if the 2-bit information field corresponding to the first information is 10, the terminal device determines that the uplink control channel resource for carrying uplink control information is the $3^{rd}$ uplink control channel resource configured by using the higher layer signaling; or
- if the 2-bit information field corresponding to the first information is 11, the terminal device determines that the uplink control channel resource for carrying uplink control information is the $4^{th}$ uplink control channel resource configured by using the higher layer signaling.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the four uplink control channel resources including the $1^{st}$ uplink control channel resource, the $2^{nd}$ uplink control channel resource, the $3^{rd}$ uplink control channel resource, and the $4^{th}$ uplink control channel resource each includes at least two uplink control channel resources that correspond to different quantities of symbols, or correspond to different quantities of resource blocks, or correspond to different symbols.

S104. The terminal device sends uplink control information to the network device by using the uplink control channel resource.

Specifically, any existing processing method may be used by the terminal device to send the uplink control information to the network device by using the uplink control channel resource. For example, steps such as performing channel coding, modulation, and mapping on the uplink control information may be included. This embodiment of this application imposes no special limitation thereto.

S105. The network device receives, on the uplink control channel resource for carrying uplink control information, the uplink control information sent by the terminal device.

Optionally, if the downlink control information further includes second information, and the second information is used to indicate a subframe for carrying uplink control information, this step may further include:

The network device receives, on a symbol for carrying uplink control information in a subframe for carrying uplink control information, the uplink control information sent by the terminal device.

It should be noted that, in this embodiment of this application, an order of steps S101 to S105 is not limited, and a mutual dependency between steps S101 to S105 is not limited either.

The following describes in detail the information transmission method provided in this embodiment of this application by using a specific example.

A first uplink control channel resource set includes a first uplink control channel resource, a second uplink control channel resource, a third uplink control channel resource, and a fourth uplink control channel resource.

The first uplink control channel resource corresponds to one symbol and the first uplink control channel resource may be carried on a last-but-one symbol in a subframe. The second uplink control channel resource corresponds to one symbol and the second uplink control channel resource may be carried on a last symbol in the subframe. The third uplink control channel resource corresponds to two symbols. The fourth uplink control channel resource corresponds to two symbols. The third uplink control channel resource and the fourth uplink control channel resource may occupy different resource blocks.

The downlink control information (DCI) is used to schedule a physical downlink shared channel (PDSCH) transmission, and the uplink control information (UCI) is a HARQ feedback corresponding to the PDSCH transmission. The HARQ feedback specifically includes an acknowledgment (ACK) and/or a negative acknowledgement (NACK).

Figure 3:
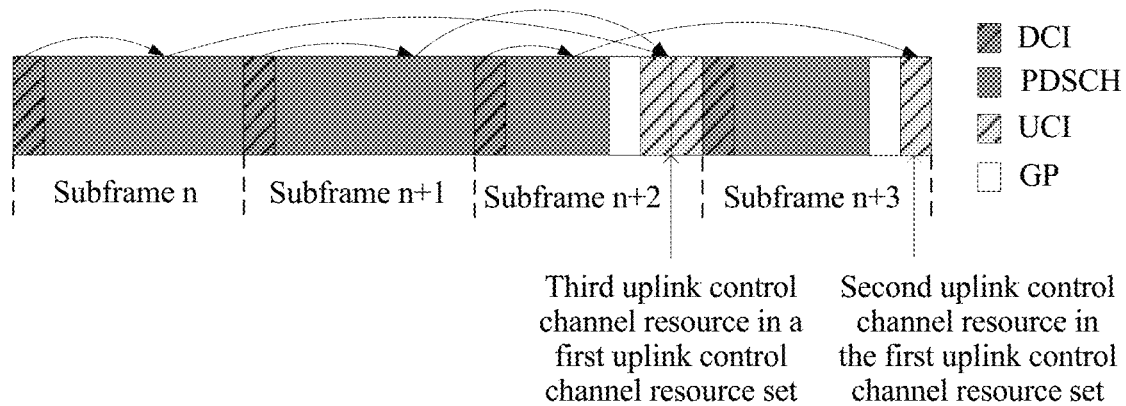
FIG. 3 is a schematic structural diagram of an uplink control channel resource in Embodiment 1 of the information transmission method according to an embodiment of this application.

FIG. 3 is a schematic structural diagram of an uplink control channel resource in Embodiment 1 of the information transmission method according to an embodiment of this application. As shown in FIG. 3, four subframes are used as an example for description. Serial numbers of the subframes are respectively a subframe n, a subframe n+1, a subframe n+2, and a subframe n+3, where n is a subframe number, and n is an integer greater than or equal to 0. The subframe n and the subframe n+1 are type 1 subframes, and the subframe n+2 and the subframe n+3 are type 3 subframes.

Specifically, the subframe n carries DCI, the DCI is carried on a first symbol in the subframe n, the DCI is used to schedule a PDSCH transmission, and the PDSCH transmission is carried in the subframe n. The DCI includes first information, and the first information indicates that a HARQ feedback corresponding to the PDSCH transmission is to be carried on an uplink control channel resource that is transmitted in the subframe n+2, and specifically, the third uplink control channel resource in the first uplink control channel resource set.

The subframe n+1 carries DCI, the DCI is carried on a first symbol in the subframe n+1, the DCI is used to schedule a PDSCH transmission, and the PDSCH transmission is carried in the subframe n+1. The DCI includes first information, and the first information indicates that a HARQ feedback corresponding to the PDSCH transmission is to be carried on the uplink control channel resource that is transmitted in the subframe n+2, and specifically, the third uplink control channel resource in the first uplink control channel resource set.

The subframe n+2 carries DCI, the DCI is carried on a first symbol in the subframe n+2, the DCI is used to schedule a PDSCH transmission, and the PDSCH transmission is carried in the subframe n+2. The DCI includes first information, and the first information indicates that a HARQ feedback corresponding to the PDSCH transmission is to be carried on an uplink control channel resource that is transmitted in the subframe n+3, and specifically, the second uplink control channel resource in the first uplink control channel resource set.

It can be learned that in the example shown in FIG. 3, the HARQ feedback corresponding to the subframe n and the HARQ feedback corresponding to the subframe n+1 need to be carried in the subframe n+2, and therefore a relatively large uplink control channel resource is required. The first information included in the DCI carried in the subframe n and the first information included in the DCI carried in the subframe n+1 are used to indicate that the uplink control channel resource for carrying the HARQ feedback corresponding to the subframe n and the HARQ feedback corresponding to the subframe n+1 is the third uplink control channel resource in the first uplink control channel resource set. Because the third uplink control channel resource corresponds to two symbols, to be specific, the terminal device transmits UCI in the subframe n+2 by using an uplink control channel occupying two symbols, both the HARQ feedback corresponding to the subframe n and the HARQ feedback corresponding to the subframe n+1 can be transmitted in the subframe n+2, so that UCI transmission reliability is ensured.

However, for the subframe n+3, only the HARQ feedback corresponding to the subframe n+2 needs to be carried in the subframe n+3, and therefore a relatively small uplink control channel resource is required. The first information included in the DCI carried in the subframe n+2 is used to indicate that the uplink control channel resource for carrying the HARQ feedback corresponding to the subframe n+2 is the second uplink control channel resource in the first uplink control channel resource set. Because the second uplink control channel resource corresponds to one symbol, to be specific, the terminal device transmits UCI in the subframe n+3 by using an uplink control channel occupying one symbol, the HARQ feedback corresponding to the subframe n+2 can be transmitted in the subframe n+3. Because only one symbol is used for uplink control channel transmission, uplink control channel overheads are reduced and resource utilization is improved while UCI transmission performance is ensured.

The following describes in detail the information transmission method provided in this embodiment of this application by using another specific example.

A first uplink control channel resource set is configured in a same manner as the corresponding first uplink control channel resource set in FIG. 3, and details are not described herein again.

Figure 4:
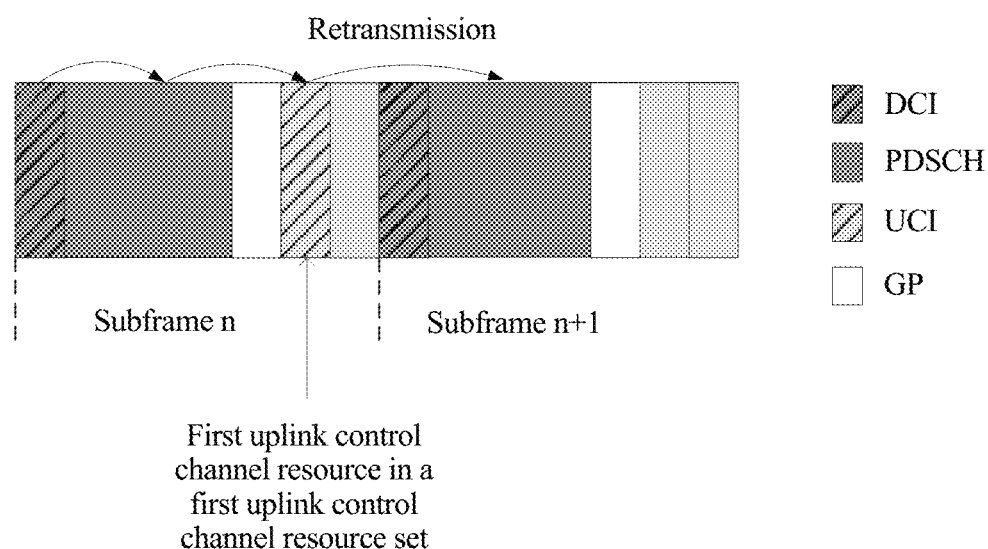
FIG. 4 is another schematic structural diagram of an uplink control channel resource in Embodiment 1 of the information transmission method according to an embodiment of this application.

FIG. 4 is another schematic structural diagram of an uplink control channel resource in Embodiment 1 of the information transmission method according to an embodiment of this application. As shown in FIG. 4, two subframes are used as an example for description. Serial numbers of the subframes are respectively a subframe n and a subframe n+1, where n is a subframe number, and n is an integer greater than or equal to 0. The subframe n and the subframe n+1 are type 3 subframes.

Specifically, the subframe n carries DCI, the DCI is carried on a first symbol in the subframe n, the DCI is used to schedule a PDSCH transmission, and the PDSCH transmission is carried in the subframe n. The DCI includes first information and second information. The second information indicates that a HARQ feedback corresponding to the PDSCH transmission is to be transmitted in the same subframe (the subframe n). The first information indicates that the HARQ feedback corresponding to the PDSCH transmission is to be carried on an uplink control channel resource that is transmitted in the same subframe (the subframe n), and specifically, a first uplink control channel resource in the first uplink control channel resource set.

If an error occurs in the PDSCH transmission, a retransmission corresponding to the PDSCH is carried in the subframe n+1, and DCI corresponding to the retransmission is carried on a first symbol in the subframe n+1.

It can be learned that in the example shown in FIG. 4, the DCI carried in the subframe n includes the first information and the second information, the DCI carried in the subframe n is used to schedule the PDSCH transmission in the current subframe (the subframe n), the first information and the second information indicate that the HARQ feedback corresponding to the PDSCH transmission is to be transmitted in the current subframe (the subframe n), and the HARQ feedback is specifically carried on a last-but-one symbol in the current subframe (the subframe n). In this way, a processing time of one symbol (a last symbol in the subframe n) is reserved for a network device side, so that the retransmission can be scheduled on the first symbol in the subframe n+1 to perform fast retransmission.

However, in the prior art, a fixed uplink control channel resource is reversed. If only a last symbol in a subframe n is reserved to transmit UCI, a network device side may fail to schedule a retransmission in a subframe n+1 because no processing time is reserved for the network device side, and the retransmission cannot be scheduled until a subframe n+2, resulting in an increased service latency. If a last-but-one symbol in the subframe n is reserved to transmit UCI, although fast retransmission can be performed, the last symbol in the subframe n cannot be efficiently used, resulting in relatively low resource utilization.

It can be learned that compared with the prior art, the information transmission method provided in this embodiment of this application can resolve a prior-art technical problem of inability to flexibly reserve and indicate an uplink control channel resource in a subframe, to perform fast HARQ feedback and fast retransmission and adapt to flexible HARQ timing.

This embodiment of this application provides the information transmission method, including: The network device sends the downlink control information, where the downlink control information includes the first information; the terminal device receives the downlink control information, determines, based on the first information, the uplink control channel resource for carrying uplink control information, and sends the uplink control information to the network device by using the uplink control channel resource; and the network device receives, on the uplink control channel resource for carrying uplink control information, the uplink control information sent by the terminal device. Therefore, according to the information transmission method provided in this embodiment of this application, the first information may be used to flexibly reserve and indicate the uplink control channel resource that is used to transmit uplink control information in each subframe. In this way, configuration flexibility of the uplink control channel resource is improved, and system resource utilization is improved.

Figure 5:
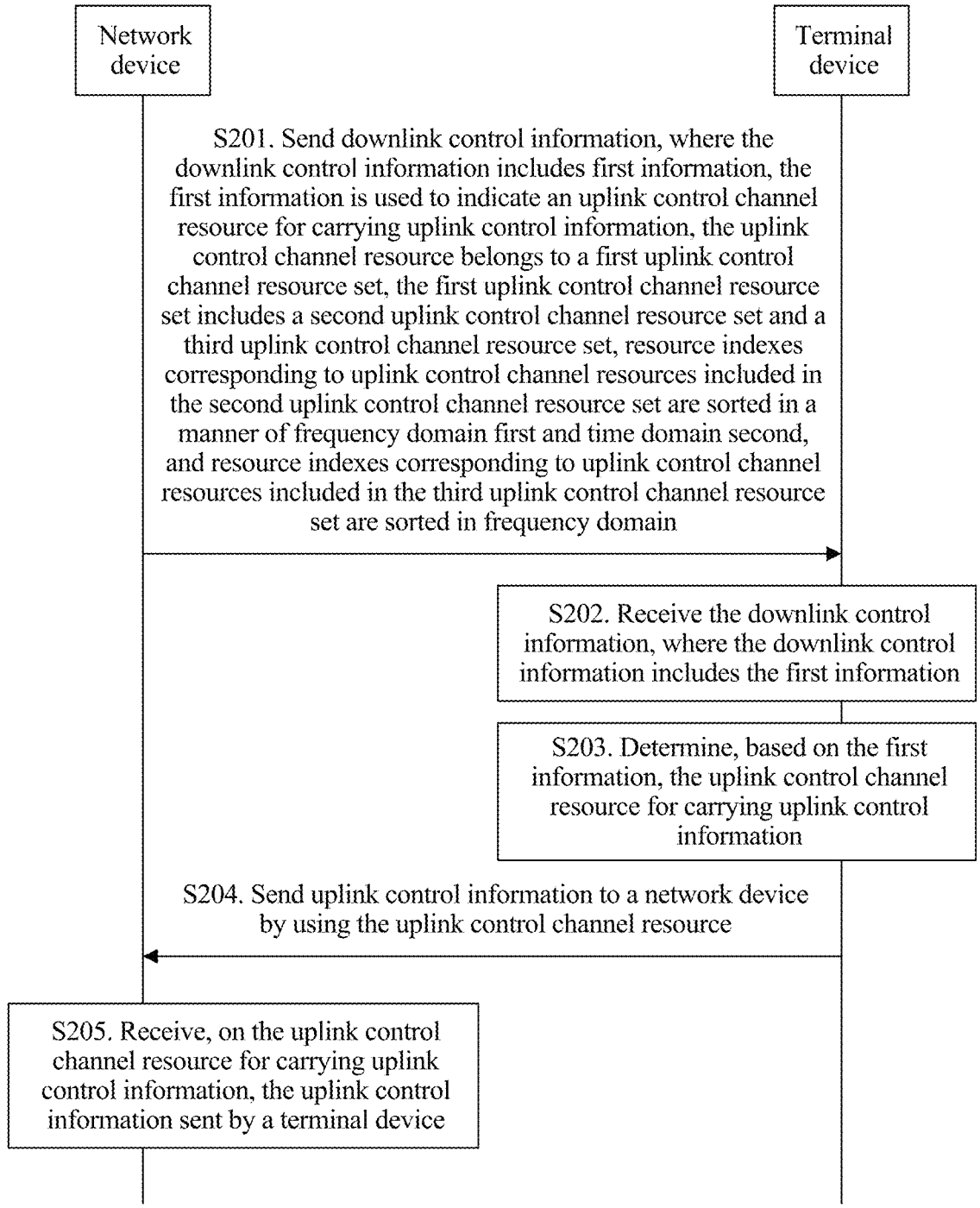
FIG. 5 is a schematic flowchart of Embodiment 2 of an information transmission method according to an embodiment of this application.

FIG. 5 is a schematic flowchart of Embodiment 2 of an information transmission method according to an embodiment of this application. A difference between this embodiment of this application and Method Embodiment 1 is that implementations of a first uplink control channel resource set are different. As shown in FIG. 5, the information transmission method provided in this embodiment of this application may include the following steps.

S201. A network device sends downlink control information, where the downlink control information includes first information.

The first information is used to indicate an uplink control channel resource for carrying uplink control information.

The uplink control channel resource belongs to a first uplink control channel resource set, the first uplink control channel resource set includes a second uplink control channel resource set and a third uplink control channel resource set, resource indexes corresponding to uplink control channel resources included in the second uplink control channel resource set are sorted in a manner of frequency domain first and time domain second, and resource indexes corresponding to uplink control channel resources included in the third uplink control channel resource set are sorted in frequency domain.

Specifically, the network device sends the downlink control information to a terminal device, where the downlink control information includes the first information, the first information indicates the uplink control channel resource, and the uplink control channel resource is used to carry uplink control information. The uplink control channel resource belongs to the first uplink control channel resource set, the first uplink control channel resource set includes the second uplink control channel resource set and the third uplink control channel resource set, the resource indexes corresponding to the uplink control channel resources included in the second uplink control channel resource set are sorted in the manner of frequency domain first and time domain second, and the resource indexes corresponding to the uplink control channel resources included in the third uplink control channel resource set are sorted in frequency domain. In other words, a resource index corresponding to the reserved uplink control channel resource that is used to carry uplink control information and that is indicated by the first information is not fixed, but may be changed based on different sorting manners. In other words, an uplink control channel resource that is used to transmit uplink control information in each subframe may be flexibly changed.

It can be learned that, compared with the prior art in which a fixed uplink control channel resource is reserved, in the information transmission method provided in this embodiment of this application, the first information may be used to flexibly reserve and indicate the uplink control channel resource that is used to transmit uplink control information in each subframe. In this way, configuration flexibility of the uplink control channel resource is improved.

In addition, because the uplink control channel resource that is used to transmit an uplink control channel in each subframe may be flexibly reserved and indicated, a size of the uplink control channel resource may be changed based on a quantity of uplink control information feedbacks, so that a waste of resources or a lack of resources is avoided, and system resource utilization is improved.

Optionally, that the resource indexes corresponding to the uplink control channel resources included in the second uplink control channel resource set are sorted in the manner of frequency domain first and time domain second may include:

In the resource indexes sorted in the manner of frequency domain first and time domain second, a smallest resource index corresponds to a last symbol in a subframe; or when sorting is performed in the manner of frequency domain first and time domain second, the sorting starts from a last symbol in a subframe or a slot.

Optionally, a quantity of symbols corresponding to the uplink control channel resource included in the second uplink control channel resource set is less than a quantity of symbols corresponding to the uplink control channel resource included in the third uplink control channel resource set.

Optionally, the quantity of symbols corresponding to the uplink control channel resource included in the third uplink control channel resource set is greater than or equal to 2.

Optionally, the quantity of symbols corresponding to the uplink control channel resource included in the second uplink control channel resource set is equal to 1.

Optionally, the second uplink control channel resource set includes at least two uplink control channel resources that correspond to different symbols.

Optionally, that the at least two uplink control channel resources correspond to different symbols may be that at least two uplink control channel resource sets correspond to different symbol positions or different resource block positions.

For example, the second uplink control channel resource set includes two uplink control channel resources. One uplink control channel resource corresponds to a last symbol in a subframe, and the other uplink control channel resource corresponds to a last-but-one symbol in the subframe.

Optionally, that a network device sends downlink control information, where the downlink control information includes first information, and the first information is used to indicate an uplink control channel resource for carrying uplink control information in S201 may have the following three implementations.

First implementation: The network device sends a downlink control channel, where downlink control information carried on the downlink control channel includes first information, and the first information is used to indicate an uplink control channel resource for carrying uplink control information.

Second implementation: The network device sends a downlink control channel, where a downlink control information format corresponding to the downlink control channel includes a first information field, and the first information field is used to indicate an uplink control channel resource for carrying uplink control information.

Third implementation: The network device sends a downlink control information format, where the downlink control information format includes a first information field, and the first information field is used to indicate an uplink control channel resource for carrying uplink control information.

Optionally, the uplink control channel resource may be a time-frequency domain resource and/or a code resource corresponding to an uplink control channel. The code resource may be a cyclic shift and/or an orthogonal spreading code of a sequence corresponding to the uplink control channel.

Optionally, that the first information is used to indicate an uplink control channel resource for carrying uplink control information may include:

The first information is used to indicate a resource index corresponding to the uplink control channel resource for carrying uplink control information, and the resource index corresponding to the uplink control channel resource is used by the terminal device to determine, based on the resource index, the time-frequency domain resource and/or the code resource corresponding to the uplink control channel.

Further, in this embodiment of this application, S201 may further include:

The network device sends higher layer signaling, where the higher layer signaling is used to indicate the first uplink control channel resource set.

Specifically, the network device may flexibly configure a required uplink control channel resource to meet different scenario requirements and different service transmission requirements, and the network device may configure all uplink control channel resources included in the first uplink control channel resource set for the terminal device by using the higher layer signaling. In this way, configuration flexibility of the uplink control channel resource is further improved, and uplink control information transmission performance is ensured.

Optionally, that the higher layer signaling is used to indicate the first uplink control channel resource set may have the following four implementations.

First implementation:

The higher layer signaling is used to indicate resource indexes corresponding to uplink control channel resources in the first uplink control channel resource set.

Second implementation:

The higher layer signaling is used to indicate resource indexes corresponding to uplink control channel resources in the first uplink control channel resource set, and quantities of symbols or resource blocks corresponding to the resource indexes.

Third implementation:

The higher layer signaling is used to indicate the second uplink control channel resource set and the third uplink control channel resource set included in the first uplink control channel resource set.

Fourth implementation:

The higher layer signaling is used to indicate the resource indexes corresponding to the uplink control channel resources in the second uplink control channel resource set included in the first uplink control channel resource set and the resource indexes corresponding to the uplink control channel resources in the third uplink control channel resource set included in the first uplink control channel resource set.

Further, in this embodiment of this application, S201 may further include:

The network device determines the uplink control channel resource for carrying uplink control information; and the network device determines the first information in the downlink control information based on the uplink control channel resource for carrying uplink control information.

Specifically, the foregoing step provides an implementation of determining the first information by the network device. The network device first determines the uplink control channel resource for carrying uplink control information, and then determines the first information in the downlink control information based on the uplink control channel resource.

The network device may determine the uplink control channel resource based on different application scenarios and different service requirements, and the first information is used to indicate the uplink control channel resource, to flexibly match different application scenarios and different services.

It should be noted that this embodiment of this application imposes no special limitation on a specific implementation of the first information, and the first information is set based on a requirement.

Optionally, in a specific implementation, if the first information corresponds to a 2-bit information field, that the network device determines the first information in the downlink control information based on the uplink control channel resource for carrying uplink control information may include:

If the uplink control channel resource for carrying uplink control information is the $1^{st}$ uplink control channel resource, the network device determines that the 2-bit information field corresponding to the first information is 00;

if the uplink control channel resource for carrying uplink control information is the $2^{nd}$ uplink control channel resource, the network device determines that the 2-bit information field corresponding to the first information is 01;

if the uplink control channel resource for carrying uplink control information is the $3^{rd}$ uplink control channel resource, the network device determines that the 2-bit information field corresponding to the first information is 10; or if the uplink control channel resource for carrying uplink control information is the $4^{th}$ uplink control channel resource, the network device determines that the 2-bit information field corresponding to the first information is 11.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the first uplink control channel resource set includes at least two uplink control channel resources from different uplink control channel resource sets. At least one uplink control channel resource comes from the second uplink control channel resource set, and at least one uplink control channel resource comes from the third uplink control channel resource set.

Further, the downlink control information may further include second information, and the second information is used to indicate a subframe for carrying uplink control information.

Specifically, if the downlink control information is carried in a subframe n, the uplink control information is carried in a subframe n+k, where n is an integer greater than or equal to 0, k is an integer greater than or equal to 0, and a value of k is determined based on the second information.

It can be learned that when k is equal to 0, the downlink control information and the uplink control information may be carried in a same subframe, so that fast HARQ retransmission can be performed and a service requirement for a relatively small latency can be met; and when k is greater than 0, the uplink control information is carried in a subframe following a subframe in which the downlink control information is carried, so that a requirement of a service that does not have a strict latency requirement can be met.

Further, the downlink control information may further include third information, the third information is used to trigger reporting of channel state information, and the uplink control information is the channel state information.

It should be noted that this embodiment of this application imposes no special limitation on a definition and an implementation of the channel state information. For example, the channel state information may include channel quality information, a code matrix indication, a layer quantity indication, and beam related information.

Further, the downlink control information may further include fourth information, the fourth information is used to indicate a resource set to which the uplink control channel resource for carrying uplink control information belongs, and the resource set to which the uplink control channel resource belongs is the second uplink control channel resource set or the third uplink control channel resource set.

Specifically, the first information and the fourth information in the downlink control information can be used to enable the terminal device to determine, based on the first information and the fourth information, the uplink control channel resource for carrying uplink control information.

Optionally, the downlink control information is used to schedule a downlink shared channel transmission, and the uplink control information is a hybrid automatic repeat request feedback corresponding to the downlink shared channel transmission.

S202. A terminal device receives the downlink control information, where the downlink control information includes the first information.

The first information is used to indicate the uplink control channel resource for carrying uplink control information.

The uplink control channel resource belongs to the first uplink control channel resource set, the first uplink control channel resource set includes the second uplink control channel resource set and the third uplink control channel resource set, the resource indexes corresponding to the uplink control channel resources included in the second uplink control channel resource set are sorted in the manner of frequency domain first and time domain second, and the resource indexes corresponding to the uplink control channel resources included in the third uplink control channel resource set are sorted in frequency domain.

Specifically, the terminal device receives the downlink control information sent by the network device, where the downlink control information includes the first information, the first information indicates the uplink control channel resource, and the uplink control channel resource is used to carry uplink control information. The uplink control channel resource belongs to the first uplink control channel resource set, the first uplink control channel resource set includes the second uplink control channel resource set and the third uplink control channel resource set, the resource indexes corresponding to the uplink control channel resources included in the second uplink control channel resource set are sorted in the manner of frequency domain first and time domain second, and the resource indexes corresponding to the uplink control channel resources included in the third uplink control channel resource set are sorted in frequency domain. In other words, a resource index corresponding to the reserved uplink control channel resource that is used to carry uplink control information and that is indicated by the first information is not fixed, but may be changed based on different sorting manners. In other words, an uplink control channel resource that is used to transmit uplink control information in each subframe may be flexibly changed.

Therefore, compared with the prior art in which a fixed uplink control channel resource is reserved, in the information transmission method provided in this embodiment of this application, the first information may be used to flexibly reserve and indicate the uplink control channel resource that is used to transmit uplink control information in each subframe. In this way, configuration flexibility of the uplink control channel resource is improved.

In addition, because the uplink control channel resource that is used to transmit an uplink control channel in each subframe may be flexibly reserved and indicated, a size of the uplink control channel resource may be changed based on a quantity of uplink control information feedbacks, so that a waste of resources or a lack of resources is avoided, and system resource utilization is improved.

Optionally, that a terminal device receives the downlink control information, where the downlink control information includes the first information, and the first information is used to indicate the uplink control channel resource for carrying uplink control information in S202 may have the following three implementations.

First implementation: The terminal device receives a downlink control channel, where downlink control information carried on the downlink control channel includes first information, and the first information is used to indicate an uplink control channel resource for carrying uplink control information.

Second implementation: The terminal device receives a downlink control channel, where a downlink control information format corresponding to the downlink control channel includes a first information field, and the first information field is used to indicate an uplink control channel resource for carrying uplink control information.

Third implementation: The terminal device detects a downlink control information format, where the downlink control information format includes a first information field, and the first information field is used to indicate an uplink control channel resource for carrying uplink control information.

Further, in this embodiment of this application, S202 may further include:

The terminal device receives the higher layer signaling; and the terminal device determines the first uplink control channel resource set based on the higher layer signaling.

Specifically, the terminal device receives the higher layer signaling sent by the network device, and the terminal device may learn of, by using the higher layer signaling, all uplink control channel resources included in the first uplink control channel resource set that are configured by the network device. Because the terminal device may learn of an uplink control channel resource that is flexibly configured by the network device based on different scenario requirements and different service requirements, configuration flexibility of the uplink control channel resource is further improved, and uplink control information transmission performance is ensured.

Optionally, that the terminal device determines the first uplink control channel resource set based on the higher layer signaling may have the following four implementations.

First implementation: The terminal device determines, based on the higher layer signaling, resource indexes corresponding to uplink control channel resources in the first uplink control channel resource set.

Second implementation: The terminal device determines, based on the higher layer signaling, resource indexes corresponding to uplink control channel resources in the first uplink control channel resource set, and quantities of symbols or resource blocks corresponding to the resource indexes.

Third implementation: The terminal device determines, based on the higher layer signaling, the second uplink control channel resource set and the third uplink control channel resource set included in the first uplink control channel resource set.

Fourth implementation:

The terminal device determines, based on the higher layer signaling, the resource indexes corresponding to the uplink control channel resources in the second uplink control channel resource set included in the first uplink control channel resource set and the resource indexes corresponding to the uplink control channel resources in the third uplink control channel resource set included in the first uplink control channel resource set.

Optionally, if the first information corresponds to a 2-bit information field, that the first information is used to indicate the uplink control channel resource for carrying uplink control information may be as follows:

If the 2-bit information field corresponding to the first information is 00, the uplink control channel resource for carrying uplink control information is the $1^{st}$ uplink control channel resource;

if the 2-bit information field corresponding to the first information is 01, the uplink control channel resource for carrying uplink control information is the $2^{nd}$ uplink control channel resource;

if the 2-bit information field corresponding to the first information is 10, the uplink control channel resource for carrying uplink control information is the $3^{rd}$ uplink control channel resource; or if the 2-bit information field corresponding to the first information is 11, the uplink control channel resource for carrying uplink control information is the $4^{th}$ uplink control channel resource.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the first uplink control channel resource set includes at least two uplink control channel resources from different uplink control channel resource sets. At least one uplink control channel resource comes from the second uplink control channel resource set, and at least one uplink control channel resource comes from the third uplink control channel resource set.

It should be noted that in this step, descriptions of the downlink control information, the uplink control information, the uplink control channel resource, the first uplink control channel resource set, the first information, the symbol, the resource block, the slot, the subframe, and other aspects are the same as those in S201 in this embodiment of this application, and principles are similar. Details are not described herein again.

S203. The terminal device determines, based on the first information, an uplink control channel resource for carrying uplink control information.

Optionally, that the terminal device determines, based on the first information, an uplink control channel resource for carrying uplink control information in S203 may have the following two implementations.

First implementation:

The terminal device determines, based on the first information, a resource index corresponding to the uplink control channel resource for carrying uplink control information; and the terminal device determines, based on the resource index corresponding to the uplink control channel resource, a time-frequency domain resource and/or a code resource corresponding to the uplink control channel.

Second implementation:

The terminal device determines, based on the first information, a resource index corresponding to an uplink control channel for carrying uplink control information on a symbol for carrying uplink control information; and the terminal device determines, based on the index corresponding to the uplink control channel resource, a time-frequency domain resource and/or a code resource corresponding to the uplink control channel.

Optionally, if the downlink control information further includes fourth information, S203 may include:

The terminal device determines, based on the first information and the fourth information, the uplink control channel resource for carrying uplink control information.

Optionally, that the terminal device determines, based on the first information and the fourth information, the uplink control channel resource for carrying uplink control information may include:

The terminal device determines, based on the fourth information, a resource set to which the uplink control channel resource for carrying uplink control information belongs, where the resource set to which the uplink control channel resource belongs is the second uplink control channel resource set or the third uplink control channel resource set; and the terminal device determines, based on the first information and the resource set to which the uplink control channel resource belongs, the uplink control channel resource for carrying uplink control information.

Optionally, if the first information corresponds to a 2-bit information field, that the terminal device determines, based on the first information, an uplink control channel resource for carrying uplink control information may include:

If the 2-bit information field corresponding to the first information is 00, the terminal device determines that the uplink control channel resource for carrying uplink control information is the $1^{st}$ uplink control channel resource configured by using the higher layer signaling;

if the 2-bit information field corresponding to the first information is 01, the terminal device determines that the uplink control channel resource for carrying uplink control information is the $2^{nd}$ uplink control channel resource configured by using the higher layer signaling;

if the 2-bit information field corresponding to the first information is 10, the terminal device determines that the uplink control channel resource for carrying uplink control information is the $3^{rd}$ uplink control channel resource configured by using the higher layer signaling; or if the 2-bit information field corresponding to the first information is 11, the terminal device determines that the uplink control channel resource for carrying uplink control information is the $4^{th}$ uplink control channel resource configured by using the higher layer signaling.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the first uplink control channel resource set includes at least two uplink control channel resources from different uplink control channel resource sets. At least one uplink control channel resource comes from the second uplink control channel resource set, and at least one uplink control channel resource comes from the third uplink control channel resource set.

S204. The terminal device sends uplink control information to the network device by using the uplink control channel resource.

Specifically, any existing processing method may be used by the terminal device to send the uplink control information to the network device by using the uplink control channel resource. For example, steps such as performing channel coding, modulation, and mapping on the uplink control information may be included. This embodiment of this application imposes no special limitation thereto.

S205. The network device receives, on the uplink control channel resource for carrying uplink control information, the uplink control information sent by the terminal device.

Optionally, if the downlink control information further includes second information, and the second information is used to indicate a subframe for carrying uplink control information, this step may further include:

The network device receives, on a symbol for carrying uplink control information in a subframe for carrying uplink control information, the uplink control information sent by the terminal device.

It should be noted that, in this embodiment of this application, an order of steps S201 to S205 is not limited, and a mutual dependency between steps S201 to S205 is not limited either.

It should be noted that in this embodiment of this application, descriptions of the downlink control information, the uplink control information, the uplink control channel resource, the first uplink control channel resource set, the first information, the second information, the third information, the symbol, the resource block, the slot, the subframe, the resource index corresponding to the uplink control channel resource, and other aspects are the same as those in Method Embodiment 1 of this application, and principles are similar. Details are not described herein again.

The following describes in detail the information transmission method provided in this embodiment of this application by using a specific example, and mainly describes an implementation of a second uplink control channel resource set.

Figure 6:
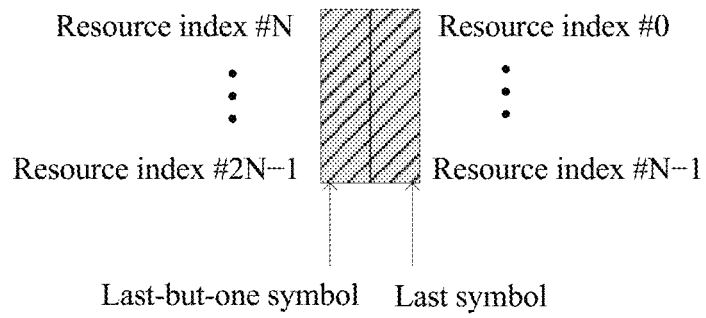
FIG. 6 is a schematic structural diagram of an uplink control channel resource in Embodiment 2 of the information transmission method according to an embodiment of this application.

FIG. 6 is a schematic structural diagram of an uplink control channel resource in Embodiment 2 of the information transmission method according to an embodiment of this application. As shown in FIG. 6, resource indexes corresponding to uplink control channel resources included in a second uplink control channel resource set are sorted in a manner of frequency domain first and time domain second, and each uplink control channel resource in the second uplink control channel resource set corresponds to one symbol.

Specifically, uplink control channel resources on a last symbol are sorted first, and then uplink control channel resources on a last-but-one symbol are sorted. The last symbol corresponds to uplink control channel resources whose resource indexes are from 0 to N−1, and the last-but-one symbol corresponds to uplink control channel resources whose resource indexes are from N to 2N−1.

In this embodiment of this application, the second uplink control channel resource set may include two uplink control channel resources, for example, include a first uplink control channel resource and a second uplink control channel resource, and the first uplink control channel resource and the second uplink control channel resource correspond to different symbols. For example, the first uplink control channel resource corresponds to a resource index 2 and corresponds to the last symbol, and the second uplink control channel resource corresponds to a resource index N+2 and corresponds to the last-but-one symbol.

In this embodiment of this application, alternatively, the second uplink control channel resource set may include four uplink control channel resources, and at least two uplink control channel resources correspond to different symbols. For example, a first uplink control channel resource corresponds to a resource index 2 and corresponds to the last symbol, a second uplink control channel resource corresponds to a resource index N+2 and corresponds to the last-but-one symbol, a third uplink control channel resource corresponds to a resource index N−1 and corresponds to the last symbol, and a fourth uplink control channel resource corresponds to a resource index N−2 and corresponds to the last symbol.

The following describes in detail the information transmission method provided in this embodiment of this application by using another specific example, and mainly describes an implementation of a third uplink control channel resource set.

Figure 7:
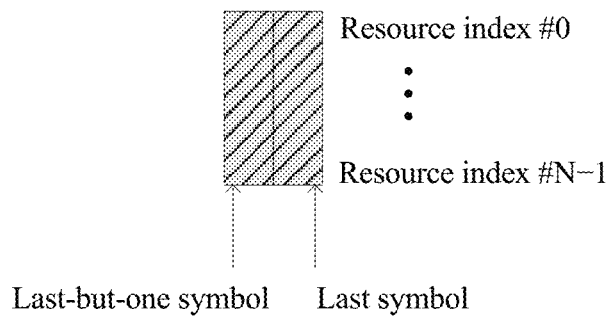
FIG. 7 is another schematic structural diagram of an uplink control channel resource in Embodiment 2 of the information transmission method according to an embodiment of this application.

FIG. 7 is another schematic structural diagram of an uplink control channel resource in Embodiment 2 of the information transmission method according to an embodiment of this application. As shown in FIG. 7, resource indexes corresponding to uplink control channel resources included in a third uplink control channel resource set are sorted in frequency domain, and each uplink control channel resource in the third uplink control channel resource set corresponds to two symbols.

Specifically, the resource indexes corresponding to the uplink control channel resources included in the third uplink control channel resource set are sorted based only on different resource blocks and/or different code resources.

In this embodiment of this application, the third uplink control channel resource set may include two uplink control channel resources, for example, include a first uplink control channel resource and a second uplink control channel resource, and the first uplink control channel resource and the second uplink control channel resource correspond to different resource blocks and/or different code resources.

In this embodiment of this application, alternatively, the third uplink control channel resource set may include four uplink control channel resources, and different uplink control channel resources correspond to different resource blocks and/or code resources.

The following describes in detail the information transmission method provided in this embodiment of this application by using still another specific example.

A first uplink control channel resource set includes a second uplink control channel resource set and a third uplink control channel resource set.

The second uplink control channel resource set includes a first uplink control channel resource and a second uplink control channel resource. The first uplink control channel resource corresponds to one symbol and the first uplink control channel resource may be carried on a last-but-one symbol in a subframe. The second uplink control channel resource corresponds to one symbol and the second uplink control channel resource may be carried on a last symbol in the subframe.

The third uplink control channel resource set includes a third uplink control channel resource and a fourth uplink control channel resource. The third uplink control channel resource corresponds to two symbols, and the fourth uplink control channel resource corresponds to two symbols. The third uplink control channel resource and the fourth uplink control channel resource may occupy different resource blocks.

Figure 8:
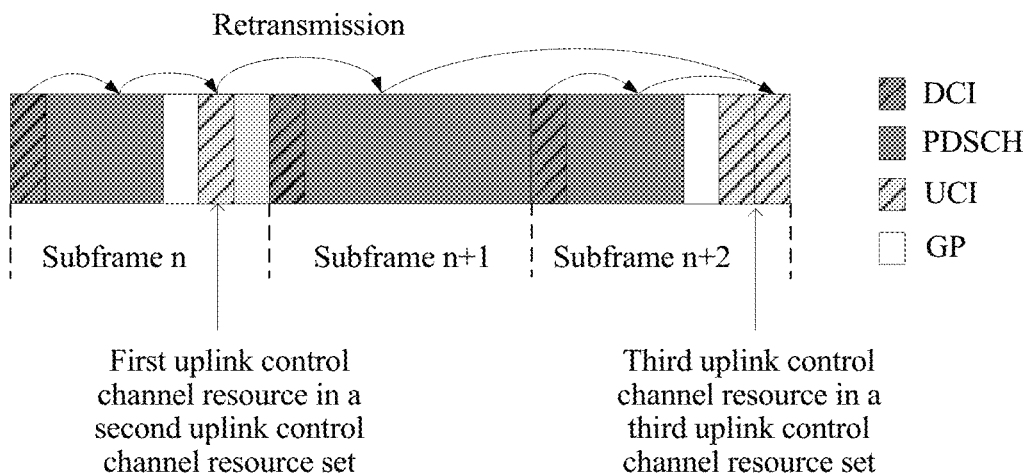
FIG. 8 is still another schematic structural diagram of an uplink control channel resource in Embodiment 2 of the information transmission method according to an embodiment of this application.

FIG. 8 is still another schematic structural diagram of an uplink control channel resource in Embodiment 2 of the information transmission method according to an embodiment of this application. As shown in FIG. 8, three subframes are used as an example for description. Serial numbers of the subframes are respectively a subframe n, a subframe n+1, and a subframe n+2, where n is a subframe number, and n is an integer greater than or equal to 0. The subframe n+1 is a type 1 subframe, and the subframe n and subframe n+2 are type 3 subframes.

Specifically, the subframe n carries DCI, the DCI is carried on a first symbol in the subframe n, the DCI is used to schedule a PDSCH transmission, and the PDSCH transmission is carried in the subframe n. The DCI includes first information, and the first information indicates that a HARQ feedback corresponding to the PDSCH transmission is to be carried on an uplink control channel resource that is transmitted in the same subframe (the subframe n), and specifically, the first uplink control channel resource in the second uplink control channel resource set.

If an error occurs in the PDSCH transmission, a retransmission corresponding to the PDSCH is carried in the subframe n+1, and DCI corresponding to the retransmission is carried on a first symbol in the subframe n+1.

It can be learned that in the example shown in FIG. 8, data carried on a PDSCH transmitted in the subframe n corresponds to a low-latency service, the DCI carried in the subframe n includes the first information, the DCI carried in the subframe n is used to schedule the PDSCH transmission in the current subframe (the subframe n), the first information indicates that the HARQ feedback corresponding to the PDSCH transmission is to be transmitted in the current subframe (the subframe n), and the HARQ feedback is specifically carried on a last-but-one symbol in the current subframe (the subframe n). In this way, a processing time of one symbol (a last symbol in the subframe n) is reserved for a network device side, so that the retransmission can be scheduled on the first symbol in the subframe n+1 to perform fast retransmission.

Further, HARQ feedbacks corresponding to PDSCH transmissions carried in the subframe n+1 and the subframe n+2 are both transmitted in the subframe n+2. In this case, a PDSCH transmitted in the subframe n+1 may not be a retransmission of a PDSCH that is in the subframe n. First information in DCI carried in the subframe n+1 and the subframe n+2 is used to indicate that an uplink control channel resource for carrying a HARQ feedback in the subframe n+2 is the third uplink control channel resource in the third uplink control channel resource set, and the third uplink control channel resource corresponds to two symbols. Therefore, both the HARQ feedback corresponding to the subframe n+1 and the subframe n+2 can be transmitted in the subframe n+2. In this way, UCI transmission reliability is ensured.

This embodiment of this application provides the information transmission method, including: The network device sends the downlink control information, where the downlink control information includes the first information; the terminal device receives the downlink control information, determines, based on the first information, the uplink control channel resource for carrying uplink control information, and sends the uplink control information to the network device by using the uplink control channel resource; and the network device receives, on the uplink control channel resource for carrying uplink control information, the uplink control information sent by the terminal device. Therefore, according to the information transmission method provided in this embodiment of this application, the first information may be used to flexibly reserve and indicate the uplink control channel resource that is used to transmit uplink control information in each subframe. In this way, configuration flexibility of the uplink control channel resource is improved, and system resource utilization is improved.

Figure 9:
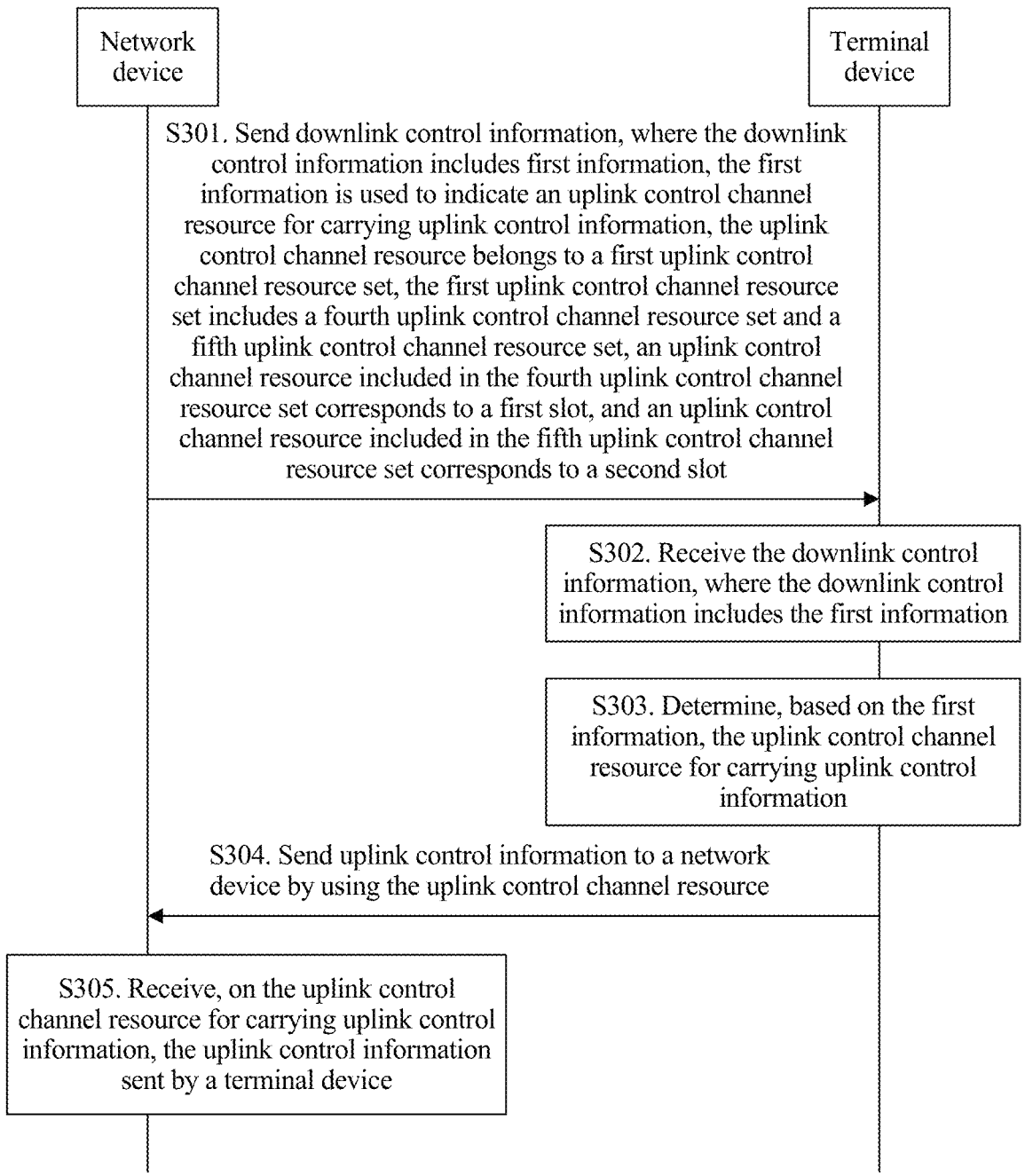
FIG. 9 is a schematic flowchart of Embodiment 3 of an information transmission method according to an embodiment of this application.

FIG. 9 is a schematic flowchart of Embodiment 3 of an information transmission method according to an embodiment of this application. A difference between this embodiment of this application and both Method Embodiment 1 and Method Embodiment 2 is that implementations of a first uplink control channel resource set are different. As shown in FIG. 9, the information transmission method provided in this embodiment of this application may include the following steps.

S301. A network device sends downlink control information, where the downlink control information includes first information.

The first information is used to indicate an uplink control channel resource for carrying uplink control information.

The uplink control channel resource belongs to a first uplink control channel resource set, the first uplink control channel resource set includes a fourth uplink control channel resource set and a fifth uplink control channel resource set, an uplink control channel resource included in the fourth uplink control channel resource set corresponds to a first slot, and an uplink control channel resource included in the fifth uplink control channel resource set corresponds to a second slot.

Specifically, the network device sends the downlink control information to a terminal device, where the downlink control information includes the first information, the first information indicates the uplink control channel resource, and the uplink control channel resource is used to carry uplink control information. The uplink control channel resource belongs to the first uplink control channel resource set, the first uplink control channel resource set includes the fourth uplink control channel resource set and the fifth uplink control channel resource set, the uplink control channel resource included in the fourth uplink control channel resource set corresponds to the first slot, and the uplink control channel resource included in the fifth uplink control channel resource set corresponds to the second slot. In other words, a slot corresponding to the reserved uplink control channel resource that is used to carry uplink control information and that is indicated by the first information is not fixed, but may be changed. In other words, an uplink control channel resource that is used to transmit uplink control information in each subframe may be flexibly changed.

It can be learned that, compared with the prior art in which a fixed uplink control channel resource is reserved, in the information transmission method provided in this embodiment of this application, the first information may be used to flexibly reserve and indicate the uplink control channel resource that is used to transmit uplink control information in each subframe. In this way, configuration flexibility of the uplink control channel resource is improved.

In addition, because the uplink control channel resource that is used to transmit an uplink control channel in each subframe may be flexibly reserved and indicated, a size of the uplink control channel resource may be changed based on a quantity of uplink control information feedbacks, so that a waste of resources or a lack of resources is avoided, and system resource utilization is improved.

Optionally, the first slot and the second slot may belong to a same subframe.

Optionally, that a network device sends downlink control information, where the downlink control information includes first information, and the first information is used to indicate an uplink control channel resource for carrying uplink control information in S301 may have the following three implementations.

First implementation: The network device sends a downlink control channel, where downlink control information carried on the downlink control channel includes first information, and the first information is used to indicate an uplink control channel resource for carrying uplink control information.

Second implementation: The network device sends a downlink control channel, where a downlink control information format corresponding to the downlink control channel includes a first information field, and the first information field is used to indicate an uplink control channel resource for carrying uplink control information.

Third implementation: The network device sends a downlink control information format, where the downlink control information format includes a first information field, and the first information field is used to indicate an uplink control channel resource for carrying uplink control information.

Optionally, the uplink control channel resource may be a time-frequency domain resource and/or a code resource corresponding to an uplink control channel. The code resource may be a cyclic shift and/or an orthogonal spreading code of a sequence corresponding to the uplink control channel.

Optionally, that the first information is used to indicate an uplink control channel resource for carrying uplink control information may include:

The first information is used to indicate a resource index corresponding to the uplink control channel resource for carrying uplink control information, and the resource index corresponding to the uplink control channel resource is used by the terminal device to determine, based on the resource index, the time-frequency domain resource and/or the code resource corresponding to the uplink control channel.

Further, in this embodiment of this application, S301 may further include:

The network device sends higher layer signaling, where the higher layer signaling is used to indicate the first uplink control channel resource set.

Specifically, the network device may flexibly configure a slot corresponding to an uplink control channel resource to meet different scenario requirements and different service transmission requirements, and the network device may configure all uplink control channel resources included in the first uplink control channel resource set for the terminal device by using the higher layer signaling. In this way, configuration flexibility of the uplink control channel resource is further improved, and uplink control information transmission performance is ensured.

Optionally, that the higher layer signaling is used to indicate the first uplink control channel resource set may have the following four implementations.

First implementation:

The higher layer signaling is used to indicate resource indexes corresponding to uplink control channel resources in the first uplink control channel resource set.

Second implementation:

The higher layer signaling is used to indicate resource indexes corresponding to uplink control channel resources in the first uplink control channel resource set, and quantities of symbols or resource blocks corresponding to the resource indexes.

Third implementation:

The higher layer signaling is used to indicate the fourth uplink control channel resource set and the fifth uplink control channel resource set included in the first uplink control channel resource set.

Fourth implementation:

The higher layer signaling is used to indicate resource indexes corresponding to uplink control channel resources in the fourth uplink control channel resource set included in the first uplink control channel resource set and resource indexes corresponding to uplink control channel resources in the fifth uplink control channel resource set included in the first uplink control channel resource set.

Optionally, the uplink control channel resource included in the fourth uplink control channel resource set corresponds to the first slot, and the uplink control channel resource included in the fifth uplink control channel resource set corresponds to the second slot Further, in this embodiment of this application, S301 may further include:

The network device determines the uplink control channel resource for carrying uplink control information; and the network device determines the first information in the downlink control information based on the uplink control channel resource for carrying uplink control information.

Specifically, the foregoing step provides an implementation of determining the first information by the network device. The network device first determines the uplink control channel resource for carrying uplink control information, and then determines the first information in the downlink control information based on the uplink control channel resource.

The network device may determine the uplink control channel resource based on different application scenarios and different service requirements, and the first information is used to indicate the uplink control channel resource, to flexibly match different application scenarios and different services.

It should be noted that this embodiment of this application imposes no special limitation on a specific implementation of the first information, and the first information is set based on a requirement.

Optionally, in a specific implementation, if the first information corresponds to a 2-bit information field, that the network device determines the first information in the downlink control information based on the uplink control channel resource for carrying uplink control information may include:

If the uplink control channel resource for carrying uplink control information is a $1^{st}$ uplink control channel resource, the network device determines that the 2-bit information field corresponding to the first information is 00;

if the uplink control channel resource for carrying uplink control information is a $2^{nd}$ uplink control channel resource, the network device determines that the 2-bit information field corresponding to the first information is 01;

if the uplink control channel resource for carrying uplink control information is a $3^{rd}$ uplink control channel resource, the network device determines that the 2-bit information field corresponding to the first information is 10; or if the uplink control channel resource for carrying uplink control information is a $4^{th}$ uplink control channel resource, the network device determines that the 2-bit information field corresponding to the first information is 11.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the first uplink control channel resource set includes at least two uplink control channel resources from different uplink control channel resource sets. At least one uplink control channel resource comes from the fourth uplink control channel resource set, and at least one uplink control channel resource comes from the fifth uplink control channel resource set.

Further, the downlink control information may further include second information, and the second information is used to indicate a subframe for carrying uplink control information.

Specifically, if the downlink control information is carried in a subframe n, the uplink control information is carried in a subframe n+k, where n is an integer greater than or equal to 0, k is an integer greater than or equal to 0, and a value of k is determined based on the second information.

It can be learned that when k is equal to 0, the downlink control information and the uplink control information may be carried in a same subframe, so that fast HARQ retransmission can be performed and a service requirement for a relatively small latency can be met; and when k is greater than 0, the uplink control information is carried in a subframe following a subframe in which the downlink control information is carried, so that a requirement of a service that does not have a strict latency requirement can be met. Using the second information improves configuration flexibility of the uplink control channel resource.

Further, the downlink control information may further include third information, the third information is used to trigger reporting of channel state information, and the uplink control information is the channel state information.

It should be noted that this embodiment of this application imposes no special limitation on a definition and an implementation of the channel state information. For example, the channel state information may include channel quality information, a code matrix indication, a layer quantity indication, and beam related information.

Optionally, the downlink control information is used to schedule a downlink shared channel transmission, and the uplink control information is a hybrid automatic repeat request feedback corresponding to the downlink shared channel transmission.

S302. A terminal device receives the downlink control information, where the downlink control information includes the first information.

The first information is used to indicate the uplink control channel resource for carrying uplink control information.

The uplink control channel resource belongs to the first uplink control channel resource set, the first uplink control channel resource set includes the fourth uplink control channel resource set and the fifth uplink control channel resource set, the uplink control channel resource included in the fourth uplink control channel resource set corresponds to the first slot, and the uplink control channel resource included in the fifth uplink control channel resource set corresponds to the second slot.

Specifically, the terminal device receives the downlink control information sent by the network device, where the downlink control information includes the first information, the first information indicates the uplink control channel resource, and the uplink control channel resource is used to carry uplink control information. The uplink control channel resource belongs to the first uplink control channel resource set, the first uplink control channel resource set includes the fourth uplink control channel resource set and the fifth uplink control channel resource set, the uplink control channel resource included in the fourth uplink control channel resource set corresponds to the first slot, and the uplink control channel resource included in the fifth uplink control channel resource set corresponds to the second slot. In other words, a slot corresponding to the reserved uplink control channel resource that is used to carry uplink control information and that is indicated by the first information is not fixed, but may be changed. In other words, an uplink control channel resource that is used to transmit uplink control information in each subframe may be flexibly changed.

Therefore, compared with the prior art in which a fixed uplink control channel resource is reserved, in the information transmission method provided in this embodiment of this application, the first information may be used to flexibly reserve and indicate the uplink control channel resource that is used to transmit uplink control information in each subframe. In this way, configuration flexibility of the uplink control channel resource is improved.

In addition, because the uplink control channel resource that is used to transmit an uplink control channel in each subframe may be flexibly reserved and indicated, a size of the uplink control channel resource may be changed based on a quantity of uplink control information feedbacks, so that a waste of resources or a lack of resources is avoided, and system resource utilization is improved.

Optionally, that a terminal device receives the downlink control information, where the downlink control information includes the first information, and the first information is used to indicate the uplink control channel resource for carrying uplink control information in S302 may have the following three implementations.

First implementation: The terminal device receives a downlink control channel, where downlink control information carried on the downlink control channel includes first information, and the first information is used to indicate an uplink control channel resource for carrying uplink control information.

Second implementation: The terminal device receives a downlink control channel, where a downlink control information format corresponding to the downlink control channel includes a first information field, and the first information field is used to indicate an uplink control channel resource for carrying uplink control information.

Third implementation: The terminal device detects a downlink control information format, where the downlink control information format includes a first information field, and the first information field is used to indicate an uplink control channel resource for carrying uplink control information.

Further, in this embodiment of this application, S302 may further include:

The terminal device receives the higher layer signaling; and the terminal device determines the first uplink control channel resource set based on the higher layer signaling.

Specifically, the terminal device receives the higher layer signaling sent by the network device, and the terminal device may learn of, by using the higher layer signaling, all uplink control channel resources included in the first uplink control channel resource set that are configured by the network device. Because the terminal device may learn of an uplink control channel resource that is flexibly configured by the network device based on different scenario requirements and different service requirements, configuration flexibility of the uplink control channel resource is further improved, and uplink control information transmission performance is ensured.

Optionally, that the terminal device determines the first uplink control channel resource set based on the higher layer signaling may have the following four implementations.

First implementation: The terminal device determines, based on the higher layer signaling, resource indexes corresponding to uplink control channel resources in the first uplink control channel resource set.

Second implementation: The terminal device determines, based on the higher layer signaling, resource indexes corresponding to uplink control channel resources in the first uplink control channel resource set, and quantities of symbols or resource blocks corresponding to the resource indexes.

Third implementation: The terminal device determines, based on the higher layer signaling, the fourth uplink control channel resource set and the fifth uplink control channel resource set included in the first uplink control channel resource set.

Fourth implementation:

The terminal device determines, based on the higher layer signaling, resource indexes corresponding to uplink control channel resources in the fourth uplink control channel resource set included in the first uplink control channel resource set and resource indexes corresponding to uplink control channel resources in the fifth uplink control channel resource set included in the first uplink control channel resource set.

Optionally, the uplink control channel resource included in the fourth uplink control channel resource set corresponds to the first slot, and the uplink control channel resource included in the fifth uplink control channel resource set corresponds to the second slot Optionally, if the first information corresponds to a 2-bit information field, that the first information is used to indicate the uplink control channel resource for carrying uplink control information may be as follows:

If the 2-bit information field corresponding to the first information is 00, the uplink control channel resource for carrying uplink control information is the $1^{st}$ uplink control channel resource;

if the 2-bit information field corresponding to the first information is 01, the uplink control channel resource for carrying uplink control information is the $2^{nd}$ uplink control channel resource;

if the 2-bit information field corresponding to the first information is 10, the uplink control channel resource for carrying uplink control information is the $3^{rd}$ uplink control channel resource; or if the 2-bit information field corresponding to the first information is 11, the uplink control channel resource for carrying uplink control information is the $4^{th}$ uplink control channel resource.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the first uplink control channel resource set includes at least two uplink control channel resources from different uplink control channel resource sets. At least one uplink control channel resource comes from the fourth uplink control channel resource set, and at least one uplink control channel resource comes from the fifth uplink control channel resource set.

It should be noted that in this step, descriptions of the downlink control information, the uplink control information, the uplink control channel resource, the first uplink control channel resource set, the first information, the symbol, the resource block, the slot, the subframe, and other aspects are the same as those in S301 in this embodiment of this application, and principles are similar. Details are not described herein again.

S303. The terminal device determines, based on the first information, an uplink control channel resource for carrying uplink control information.

Optionally, that the terminal device determines, based on the first information, an uplink control channel resource for carrying uplink control information in S303 may have the following two implementations.

First implementation:

The terminal device determines, based on the first information, a resource index corresponding to the uplink control channel resource for carrying uplink control information; and the terminal device determines, based on the resource index corresponding to the uplink control channel resource, a time-frequency domain resource and/or a code resource corresponding to the uplink control channel.

Second implementation:

The terminal device determines, based on the first information, a resource index corresponding to an uplink control channel for carrying uplink control information on a symbol for carrying uplink control information; and the terminal device determines, based on the index corresponding to the uplink control channel resource, a time-frequency domain resource and/or a code resource corresponding to the uplink control channel.

Optionally, if the first information corresponds to a 2-bit information field, that the terminal device determines, based on the first information, an uplink control channel resource for carrying uplink control information may include:

If the 2-bit information field corresponding to the first information is 00, the terminal device determines that the uplink control channel resource for carrying uplink control information is the $1^{st}$ uplink control channel resource configured by using the higher layer signaling;

if the 2-bit information field corresponding to the first information is 01, the terminal device determines that the uplink control channel resource for carrying uplink control information is the $2^{nd}$ uplink control channel resource configured by using the higher layer signaling;

if the 2-bit information field corresponding to the first information is 10, the terminal device determines that the uplink control channel resource for carrying uplink control information is the $3^{rd}$ uplink control channel resource configured by using the higher layer signaling; or if the 2-bit information field corresponding to the first information is 11, the terminal device determines that the uplink control channel resource for carrying uplink control information is the $4^{th}$ uplink control channel resource configured by using the higher layer signaling.

The $1^{st}$ uplink control channel resource, the $2^{nd}$ uplink control channel resource, the $3^{rd}$ uplink control channel resource, and the $4^{th}$ uplink control channel resource all belong to the first uplink control channel resource set, and the first uplink control channel resource set includes at least two uplink control channel resources from different uplink control channel resource sets. At least one uplink control channel resource comes from the fourth uplink control channel resource set, and at least one uplink control channel resource comes from the fifth uplink control channel resource set.

S304. The terminal device sends uplink control information to the network device by using the uplink control channel resource.

Specifically, any existing processing method may be used by the terminal device to send the uplink control information to the network device by using the uplink control channel resource. For example, steps such as performing channel coding, modulation, and mapping on the uplink control information may be included. This embodiment of this application imposes no special limitation thereto.

S305. The network device receives, on the uplink control channel resource for carrying uplink control information, the uplink control information sent by the terminal device.

Optionally, if the downlink control information further includes second information, and the second information is used to indicate a subframe for carrying uplink control information, this step may further include:

The network device receives, on a symbol for carrying uplink control information in a subframe for carrying uplink control information, the uplink control information sent by the terminal device.

It should be noted that, in this embodiment of this application, an order of steps S301 to S305 is not limited, and a mutual dependency between steps S301 to S305 is not limited either.

It should be noted that in this embodiment of this application, descriptions of the downlink control information, the uplink control information, the uplink control channel resource, the first uplink control channel resource set, the first information, the second information, the third information, the symbol, the resource block, the slot, the subframe, the resource index corresponding to the uplink control channel resource, and other aspects are the same as those in Method Embodiment 1 of this application, and principles are similar. Details are not described herein again.

The following describes in detail the information transmission method provided in this embodiment of this application by using a specific example.

A first uplink control channel resource set includes a fourth uplink control channel resource set and a fifth uplink control channel resource set, an uplink control channel resource included in the fourth uplink control channel resource set corresponds to a first slot, and an uplink control channel resource included in the fifth uplink control channel resource set corresponds to a second slot.

The fourth uplink control channel resource set includes a first uplink control channel resource and a second uplink control channel resource, and the first uplink control channel resource and the second uplink control channel resource correspond to uplink symbols included in the first slot.

The fifth uplink control channel resource set includes a third uplink control channel resource and a fourth uplink control channel resource, and the third uplink control channel resource and the fourth uplink control channel resource correspond to uplink symbols included in the second slot.

Figure 10:
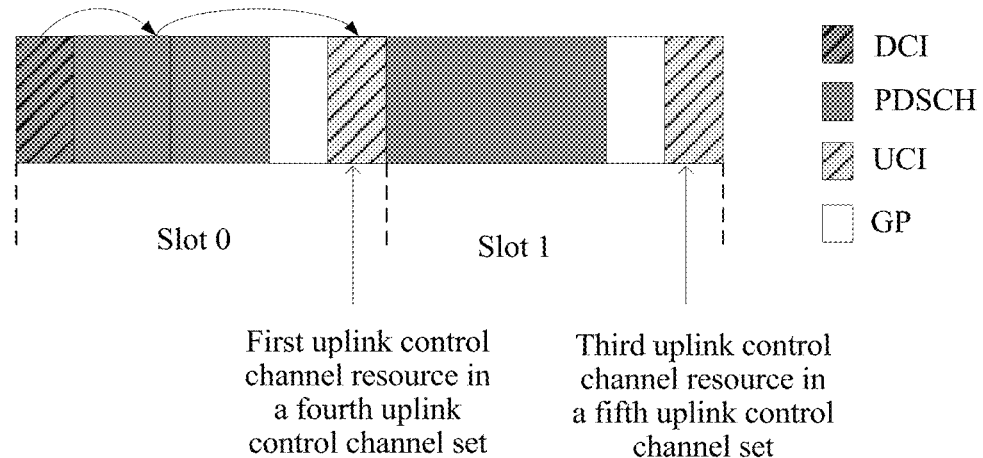
FIG. 10 is a schematic structural diagram of an uplink control channel resource in Embodiment 3 of the information transmission method according to an embodiment of this application.

FIG. 10 is a schematic structural diagram of an uplink control channel resource in Embodiment 3 of the information transmission method according to an embodiment of this application. As shown in FIG. 10, two slots are used as an example for description. Serial numbers of the slots are respectively a slot 0 and a slot 1.

Specifically, a PDSCH transmission scheduled by using DCI that is carried on a first symbol in the slot 0 is carried in the slot 0. The DCI indicates, by using first information, that a HARQ feedback corresponding to the PDSCH transmission is to be transmitted in the slot 0, in other words, indicates that the HARQ feedback corresponding to the PDSCH transmission is to be transmitted by using the first uplink control channel resource in the fourth uplink control channel resource set. In this way, fast HARQ feedback is performed, and a service latency is reduced.

If a PDSCH transmission scheduled by using DCI that is carried on a first symbol in the slot 0 is carried in the slot 0 and the slot 1, the DCI indicates, by using first information, that a HARQ feedback corresponding to the PDSCH transmission is to be transmitted in the slot 1, in other words, indicates that the HARQ feedback corresponding to the PDSCH transmission is to be transmitted by using the third uplink control channel resource in the fifth uplink control channel resource set. In addition, even if the PDSCH transmission scheduled by using the DCI is carried in the slot 0, if a latency requirement of data corresponding to the PDSCH transmission is low, the first information in the DCI may be used to indicate that the HARQ feedback corresponding to the PDSCH transmission is to be transmitted by using the third uplink control channel resource in the fifth uplink control channel resource set, so that a GP is prevented from being introduced to the slot 0 because the HARQ feedback needs to be transmitted in the slot 0, and GP overheads are reduced. In this way, there is no need to introduce two GPs to one subframe, and resource utilization is improved.

This embodiment of this application provides the information transmission method, including: The network device sends the downlink control information, where the downlink control information includes the first information; the terminal device receives the downlink control information, determines, based on the first information, the uplink control channel resource for carrying uplink control information, and sends the uplink control information to the network device by using the uplink control channel resource; and the network device receives, on the uplink control channel resource for carrying uplink control information, the uplink control information sent by the terminal device. Therefore, according to the information transmission method provided in this embodiment of this application, the first information may be used to flexibly reserve and indicate the uplink control channel resource that is used to transmit uplink control information in each subframe. In this way, configuration flexibility of the uplink control channel resource is improved, and system resource utilization is improved.

The following describes a terminal device and a network device provided in the embodiments of this application. The devices are in a one-to-one correspondence with the foregoing methods and are used to implement the information transmission methods in the foregoing method embodiments, and have same technical features and technical effects as the foregoing methods. Details are not described in the embodiments of this application again.

Figure 11:
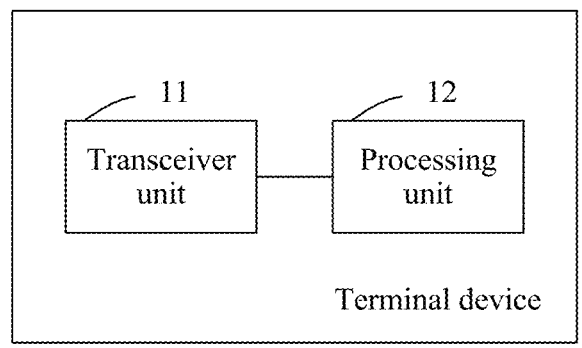
FIG. 11 is a schematic structural diagram of Embodiment 1 of a terminal device according to an embodiment of this application.

When integrated units are used, FIG. 11 is a possible schematic structural diagram of a terminal device in the foregoing method embodiments. FIG. 11 is a schematic structural diagram of Embodiment 1 of a terminal device according to an embodiment of this application. As shown in FIG. 11, the terminal device includes a transceiver unit 11 and a processing unit 12. The processing unit 12 is configured to control, manage, and perform an action of the terminal device. The transceiver unit 11 is configured to support communication between the terminal device and a network device. The terminal device may further include a storage unit, configured to store program code and data of the terminal device.

Figure 12:
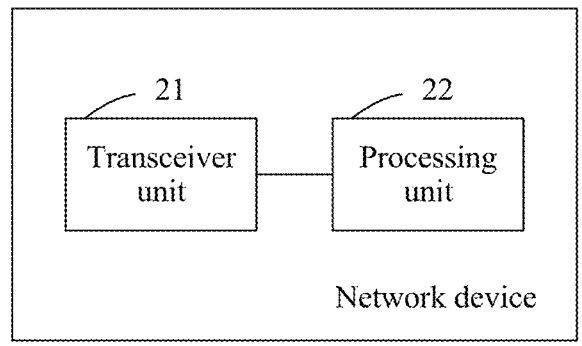
FIG. 12 is a schematic structural diagram of Embodiment 1 of a network device according to an embodiment of this application.

When integrated units are used, FIG. 12 is a possible schematic structural diagram of a network device in the foregoing embodiments. FIG. 12 is a schematic structural diagram of Embodiment 1 of a network device according to an embodiment of this application. As shown in FIG. 12, the network device may include a transceiver unit 21 and a processing unit 22. The processing unit 22 is configured to control, manage, and perform an action of the network device. The transceiver unit 21 is configured to support communication between the network device and a terminal device. The network device may further include a storage unit, configured to store program code and data of the network device.

The terminal device and the network device may be configured to perform the information transmission methods in the method embodiments shown in FIG. 2 to FIG. 10. For example, the transceiver unit 11 in the terminal device may be configured to perform S102 and S104 in FIG. 2, S202 and S204 in FIG. 5, and S302 and S304 in FIG. 9; the processing unit 12 in the terminal device may be configured to perform S103 in FIG. 2, S203 in FIG. 5, and S303 in FIG. 9; and the transceiver unit 21 in the network device may be configured to perform S101 and S105 in FIG. 2, S201 and S205 in FIG. 5, and S301 and S305 in FIG. 9.

The processing unit may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing unit may implement or execute various examples of logical blocks, modules, and circuits that are described with reference to the content disclosed in this application. Alternatively, the processing unit may be a combination that implements a computing function, for example, a combination of one or more microprocessors or a combination of a DSP and a microprocessor. The transceiver unit may be a transceiver, a transceiver circuit, or the like. The storage unit may be a memory.

The following describes a terminal device and a network device provided in the embodiments of this application. The devices are in a one-to-one correspondence with the foregoing methods and are used to implement the information transmission methods in the foregoing method embodiments, and have same technical features and technical effects as the foregoing methods. Details are not described in the embodiments of this application again.

Figure 13:
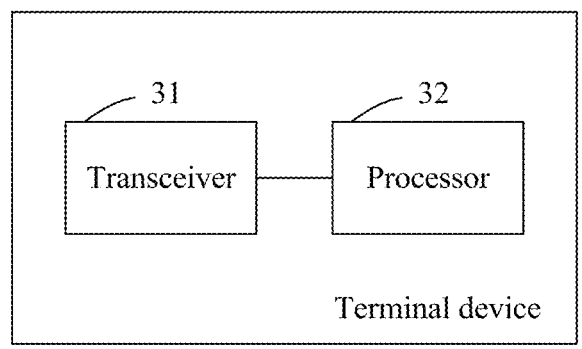
FIG. 13 is a schematic structural diagram of Embodiment 2 of a terminal device according to an embodiment of this application.

FIG. 13 is a possible schematic structural diagram of a terminal device in the foregoing method embodiments. FIG. 13 is a schematic structural diagram of Embodiment 2 of a terminal device according to an embodiment of this application. As shown in FIG. 13, the terminal device includes a transceiver 31 and a processor 32. The processor 32 is configured to control, manage, and perform an action of the terminal device. The transceiver 31 is configured to support communication between the terminal device and a network device. The terminal device may further include a storage unit, configured to store program code and data of the terminal device.

Figure 14:
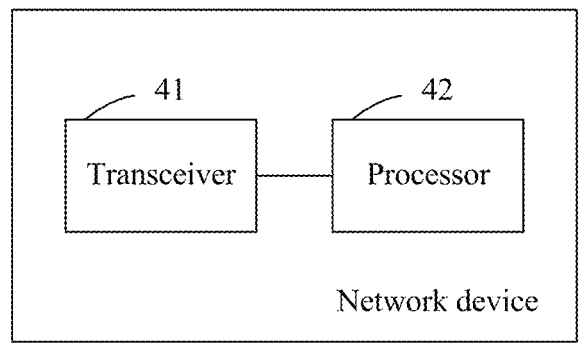
FIG. 14 is a schematic structural diagram of Embodiment 2 of a network device according to an embodiment of this application.

When integrated units are used, FIG. 14 is a possible schematic structural diagram of a network device in the foregoing embodiments. FIG. 14 is a schematic structural diagram of Embodiment 1 of a network device according to an embodiment of this application. As shown in FIG. 14, the network device may include a transceiver 41 and a processor 42. The processor 42 is configured to control, manage, and perform an action of the network device. The transceiver 41 is configured to support communication between the network device and a terminal device. The network device may further include a storage unit, configured to store program code and data of the network device.

The terminal device and the network device may be configured to perform the information transmission methods in the method embodiments shown in FIG. 2 to FIG. 10. For example, the transceiver 31 in the terminal device may be configured to perform S102 and S104 in FIG. 2, S202 and S204 in FIG. 5, and S302 and S304 in FIG. 9; the processor 32 in the terminal device may be configured to perform S103 in FIG. 2, S203 in FIG. 5, and S303 in FIG. 9; and the transceiver 41 in the network device may be configured to perform S101 and S105 in FIG. 2, S201 and S205 in FIG. 5, and S301 and S305 in FIG. 9.

The methods or algorithm steps described with reference to the content disclosed in the embodiments of this application may be implemented by using hardware, or may be implemented by executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other form that is well-known in the art. A storage medium used as an example is coupled to the processor, so that the processor can read information from the storage medium and can write information into the storage medium. Certainly, the storage medium may be a part of the processor. The processor and the storage medium may be located in an ASIC. In addition, the ASIC may be located in a base station or a terminal. Certainly, the processor and the storage medium may serve as discrete components in the base station or the terminal.

A person skilled in the art should be aware that in one or more of the foregoing examples, the functions described in the embodiments of this application may be implemented by using hardware, software, firmware, or any combination thereof. When this application is implemented by using software, these functions may be stored in a computer readable medium or transmitted as one or more instructions or code in a computer readable medium. The computer readable medium includes a computer storage medium and a communications medium, where the communications medium includes any medium that helps transmit a computer program from one place to another. The storage medium may be any available medium accessible to a general-purpose or dedicated computer.

A person of ordinary skill in the art may understand that all or some steps in the method embodiments may be implemented by a program instructing relevant hardware. The program may be stored in a computer readable storage medium. When the program is executed, the steps in the method embodiments are performed. The storage medium includes any medium that can store program code, such as a ROM, a RAM, a magnetic disk, or an optical disc.

What is claimed is:

1. A method, comprising:
receiving downlink control information, wherein the downlink control information comprises first information, the first information indicates an uplink control channel resource for carrying uplink control information, the uplink control channel resource belongs to a first uplink control channel resource set, wherein each resource in the first uplink control channel resource set occupies a different quantity of symbols, the first uplink control channel resource set comprises at least two uplink control channel resources, wherein the at least two uplink control channel resources comprise a first uplink control channel resource that occupies one symbol, and a second uplink control channel resource that occupies two symbols; and
sending the uplink control information by using the uplink control channel resource, wherein the uplink control channel resource is one of the at least two uplink control channel resources.

2. The method according to claim 1, further comprising:
receiving higher layer signaling, wherein the higher layer signaling indicates the first uplink control channel resource set.

3. The method according to claim 2, wherein the higher layer signaling indicates quantities of symbols corresponding to uplink control channel resources in the first uplink control channel resource set.

4. The method according to claim 1, wherein the first uplink control channel resource set further comprises a third uplink control channel resource that occupies seven symbols, and a fourth uplink control channel resource that occupies 14 symbols.

5. The method according to claim 1, wherein the first information indicates a resource index corresponding to the uplink control channel resource for carrying uplink control information.

6. The method according to claim 1, wherein the uplink control channel resource occupies one resource block in frequency domain and two symbols in time domain.

7. The method according to claim 1, wherein the downlink control information further comprises second information, and the second information indicates a slot for carrying the uplink control information.

8. An apparatus, comprising:
one or more processors configured to:
receive downlink control information, wherein the downlink control information comprises first information, the first information indicates an uplink control channel resource for carrying uplink control information, and the uplink control channel resource belongs to a first uplink control channel resource set, wherein each resource in the first uplink control channel resource set occupies a different quantity of symbols, and the first uplink control channel resource set comprises at least two uplink control channel resources, wherein the at least two uplink control channel resources comprise a first uplink control channel resource that occupies one symbol, and a second uplink control channel resource that occupies two symbols; and
send the uplink control information by using the uplink control channel resource, wherein the uplink control channel resource is one of the at least two uplink control channel resources.

9. The apparatus according to claim 8, wherein the one or more processors further configured to:

receive higher layer signaling, wherein the higher layer signaling indicates the first uplink control channel resource set.

10. The apparatus according to claim 9, wherein the higher layer signaling indicates quantities of symbols corresponding to uplink control channel resources in the first uplink control channel resource set.

11. The apparatus according to claim 8, wherein the first uplink control channel resource set further comprises a third uplink control channel resource that occupies seven symbols, and a fourth uplink control channel resource that occupies 14 symbols.

12. The apparatus according to claim 8, wherein the first information indicates a resource index corresponding to the uplink control channel resource for carrying uplink control information.

13. The apparatus according to claim 8, wherein the uplink control channel resource occupies one resource block in frequency domain and two symbols in time domain.

14. The apparatus according to claim 8, wherein the downlink control information further comprises second information, and the second information indicates a slot for carrying the uplink control information.

15. A non-transitory computer-readable storage medium comprising instructions which, when executed by a terminal device, cause the terminal device to carry out the following operations:

receiving downlink control information by the terminal device, wherein the downlink control information comprises first information, the first information indicates an uplink control channel resource for carrying uplink control information, and the uplink control channel resource belongs to a first uplink control channel resource set, wherein each resource in the first uplink control channel resource set occupies a different quantity of symbols, and the first uplink control channel resource set comprises at least two uplink control channel resources, wherein the at least two uplink control channel resources comprise a first uplink control channel resource that occupies one symbol, and a second uplink control channel resource that occupies two symbols; and sending the uplink control information from the terminal device by using the uplink control channel resource, wherein the uplink control channel resource is one of the at least two uplink control channel resources.

16. The non-transitory computer-readable storage medium according to claim 15, the operations further comprising:

receiving higher layer signaling, wherein the higher layer signaling indicates the first uplink control channel resource set.

17. The non-transitory computer-readable storage medium according to claim 16, wherein the higher layer signaling indicates quantities of symbols corresponding to uplink control channel resources in the first uplink control channel resource set.

18. The non-transitory computer-readable storage medium according to claim 15, wherein the first uplink control channel resource set further comprises a third uplink control channel resource that occupies seven symbols, and a fourth uplink control channel resource that occupies 14 symbols.

19. The non-transitory computer-readable storage medium according to claim 15, wherein the first information indicates a resource index corresponding to the uplink control channel resource for carrying uplink control information.

20. The non-transitory computer-readable storage medium according to claim 15, wherein the downlink control information further comprises second information, and the second information indicates a slot for carrying the uplink control information.

* * * * *